US011928545B2

United States Patent
Laffargue et al.

(10) Patent No.: US 11,928,545 B2
(45) Date of Patent: Mar. 12, 2024

(54) METHODS AND SYSTEMS OF PACKAGE PROCESSING IN A MATERIAL HANDLING ENVIRONMENT

(71) Applicant: Hand Held Products, Inc., Charlotte, NC (US)

(72) Inventors: Franck Laffargue, Toulouse (FR); Jean-Luc Courtemanche, Cadeilhan (FR); Robert Michael Hussey, Waxhaw, NC (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 17/936,625

(22) Filed: Sep. 29, 2022

(65) Prior Publication Data

US 2023/0034323 A1  Feb. 2, 2023

Related U.S. Application Data

(63) Continuation of application No. 16/722,000, filed on Dec. 20, 2019, now Pat. No. 11,481,567.
(Continued)

(51) Int. Cl.
*G06K 7/10* (2006.01)
*G06K 7/14* (2006.01)

(52) U.S. Cl.
CPC ....... *G06K 7/10722* (2013.01); *G06K 7/1417* (2013.01)

(58) Field of Classification Search
CPC ................................................ G06K 7/10722
(Continued)

(56) References Cited

U.S. PATENT DOCUMENTS 6,382,515 B1  5/2002  Good et al.
8,564,791 B2  10/2013  Lutz
(Continued)

FOREIGN PATENT DOCUMENTS

WO    2017/202832 A1    11/2017

OTHER PUBLICATIONS

Advisory Action received for U.S. Appl. No. 16/722,000, dated Jan. 31, 2022, 3 pages.
(Continued)

*Primary Examiner* — Rafferty D Kelly
(74) *Attorney, Agent, or Firm* — Alston & Bird LLP

(57) ABSTRACT

A method for processing the packages in a material handling environment is disclosed. The method includes receiving an image of a field of view of an image capturing device. The image comprising at least one decodable indicia having a predefined shape, the at least one decodable indicia attached to a package. The method further includes identifying one or more decodable indicia image coordinates, wherein each of the one or more decodable indicia image coordinates define a corner of the at least one decodable indicia using a 2-dimensional (2D) coordinate system. The method further includes transforming the one or more decodable indicia image coordinates to one or more decodable indicia spatial coordinates in the 3D coordinate system. Further, the method includes comparing the one or more decodable indicia spatial coordinates with one or more 3D region coordinates to determine whether the package is within a 3D region.

20 Claims, 13 Drawing Sheets

Related U.S. Application Data

(60) Provisional application No. 62/784,031, filed on Dec. 21, 2018.

(58) Field of Classification Search
USPC .................................................. 235/462.11
See application file for complete search history.

(56) References Cited

U.S. PATENT DOCUMENTS

| | | |
|---|---|---|
| 10,907,954 B2 | 2/2021 | Lamboley et al. |
| 2008/0035390 A1* | 2/2008 | Wurz .................... G01G 11/00 |
| | | 702/156 |
| 2012/0130527 A1 | 5/2012 | Jungen et al. |
| 2014/0027503 A1 | 1/2014 | Kennedy et al. |
| 2015/0021397 A1 | 1/2015 | Rueblinger et al. |
| 2015/0170378 A1* | 6/2015 | Moran .................. G06V 10/44 |
| | | 348/135 |
| 2015/0353282 A1 | 12/2015 | Mansfield et al. |
| 2017/0185818 A1 | 6/2017 | Zumsteg |

OTHER PUBLICATIONS

Final Rejection dated Oct. 26, 2021 for U.S. Appl. No. 16/722,000, 9 page(s).
Non-Final Rejection dated Apr. 27, 2021 for U.S. Appl. No. 16/722,000, 8 page(s).
Non-Final Rejection dated Mar. 2, 2022 for U.S. Appl. No. 16/722,000, 9 page(s).
Notice of Allowance received for U.S. Appl. No. 16/722,000, dated Jun. 21, 2022, 8 pages.

* cited by examiner

METHODS AND SYSTEMS OF PACKAGE PROCESSING IN A MATERIAL HANDLING ENVIRONMENT

CROSS-REFERENCE TO RELATED APPLICATION

The present application is a Continuation of U.S. patent application Ser. No. 16/722,000, filed Dec. 20, 2019 which claims priority to and benefit of U.S. Provisional Patent Application No. 62/784,031, filed on Dec. 21, 2018, the entire content of which is incorporated by reference into the present application.

TECHNOLOGICAL FIELD

Exemplary embodiments of the present disclosure relate generally to material handling environment and, more particularly, to methods and systems of package processing in the material handling environment.

BACKGROUND

In material handling environments, such as, but not limited to, warehouse, retail, and/or shipping, packages are transferred between various locations for various purposes such as, but not limited to, logistics, delivery, and repository management. Prior to transferring the packages, the packages are usually palletized either manually (i.e., a worker palletizing the packages) or automatically (i.e., a robotic arm palletizing the package). Typically, palletizing the packages may involve creating a stack of the packages on a platform having predetermined dimensions. Such platform is often referred to as pallet.

Applicant has identified a number of deficiencies and problems associated with conventional methods and systems of package processing. Through applied effort, ingenuity, and innovation, many of these identified problems have been solved by developing solutions that are included in embodiments of the present disclosure, many examples of which are described in detail herein.

BRIEF SUMMARY

Various embodiments illustrated herein disclose a system that includes a computing device comprising a processor and a memory including computer program code, the memory and the computer program code are configured, when executed on the processor, to: access an image captured by an image capturing device, the image comprising at least one decodable indicia associated with a package. Further, the processor is configured to identify one or more decodable indicia image coordinates, wherein each of the one or more decodable indicia image coordinates define a corner of the at least one decodable indicia using a 2-dimensional (2D) coordinate system. Furthermore, the processor is configured to identify one or more 3D region coordinates, wherein each of the one or more 3D region coordinates define a 3D region using a 3D coordinate system. The processor is further configured to transform the one or more decodable indicia image coordinates to one or more decodable indicia spatial coordinates in the 3D coordinate system. In addition, the processor is configured to compare the one or more decodable indicia spatial coordinates with the one or more 3D region coordinates to determine whether the package is within the 3D region.

Various embodiments illustrated herein disclose a method comprising receiving an image of a field of view of an image capturing device, the image comprising at least one decodable indicia having a predefined shape, the at least one decodable indicia attached to a package. The method further includes identifying one or more decodable indicia image coordinates, wherein each of the one or more decodable indicia image coordinates define the at least one decodable indicia using a 2-dimensional (2D) coordinate system. The method further includes identifying one or more 3D region coordinates, wherein each of the one or more 3D region coordinates define a 3D region using a 3D coordinate system. Additionally, the method includes transforming the one or more decodable indicia image coordinates to one or more decodable indicia spatial coordinates in the 3D coordinate system. Further, the method includes comparing the one or more decodable indicia spatial coordinates with the one or more 3D region coordinates to determine whether the package is within the 3D region.

Various embodiments illustrated herein disclose an image capturing device. The image capturing device comprises an image sensor configured to receiving light signal from a field of view and generate an image based on the received light signal. Further, the image capturing device comprises a processor communicatively coupled to the image sensor, the processor configured to identify least one decodable indicia in the generated image, the at least one decodable indicia having a predefined shape, the at least one decodable indicia attached to a package. The processor is further configured to determine one or more decodable indicia image coordinates, wherein each of the one or more decodable indicia image coordinates define a corner of the at least one decodable indicia using a 2-dimensional (2D) coordinate system. Further, the processor is configured to define a 3-dimensional (3D) region within the field of view based at least on the captured image. furthermore, the processor is configured to identify one or more 3D region coordinates, wherein each of the one or more 3D region coordinates define a corner of the 3D region using a 3D coordinate system. Additionally, the processor is configured to transform the one or more decodable indicia image coordinates to one or more decodable indicia spatial coordinates in the 3D coordinate system. Further, the processor is configured to compare the one or more decodable indicia spatial coordinates with the one or more 3D region coordinates to determine whether the package is within the 3D region.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
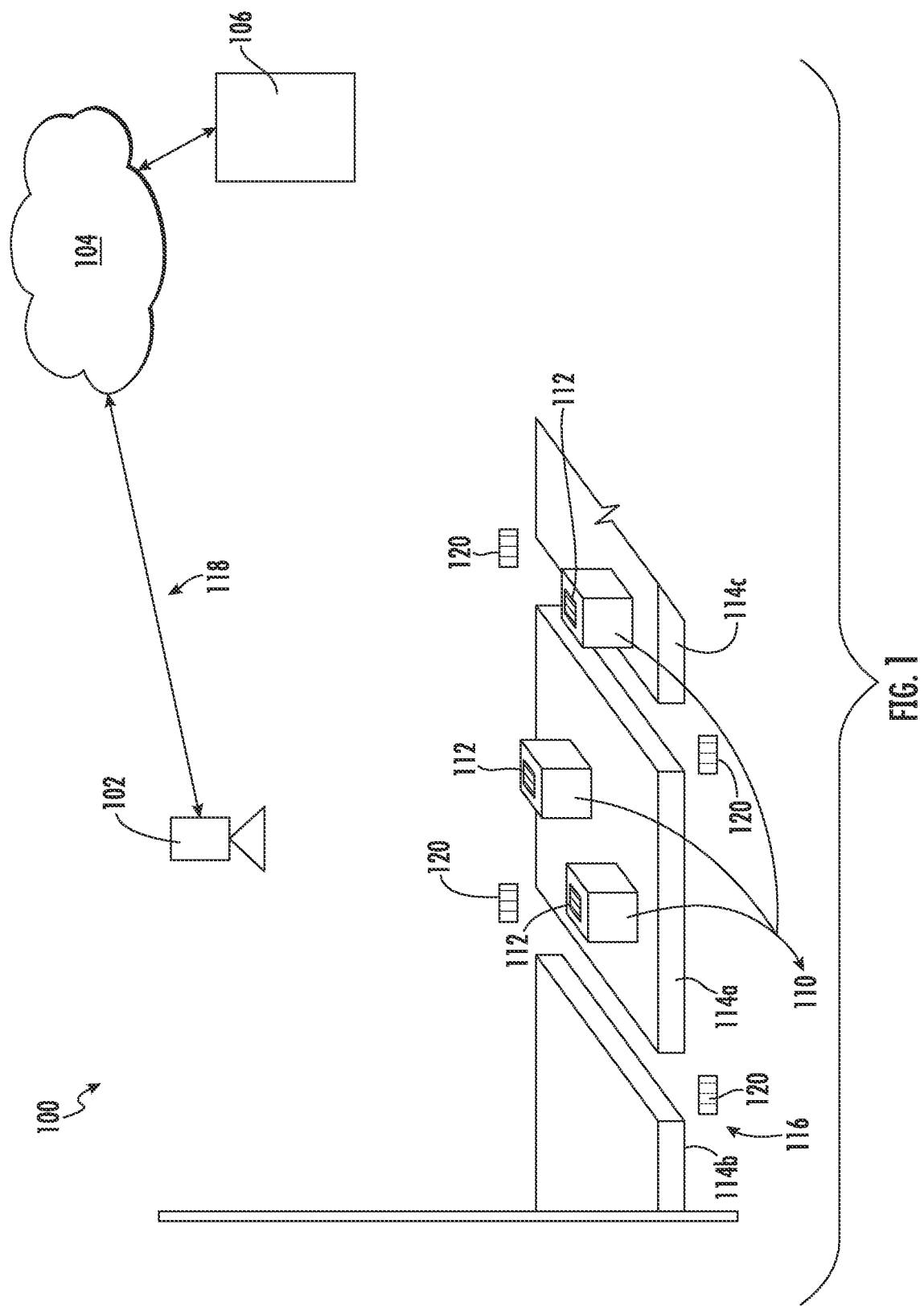
FIG. 1 illustrates an example material handling environment, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The term "comprising" means including but not limited to, and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," and the like generally mean that the particular feature, structure, or characteristic following the phrase may be included in at least one embodiment of the present disclosure, or may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "image" as used herein may correspond to a representation of an information/data in the form of plurality of pixels in an image plane that may be either a 2-dimensional plane or a 3-dimensional plane. In some examples, the image may represent information/data of a scene where each pixel in the plurality of pixels may, for example, represent a point in the scene. Furthermore, each pixel in the plurality of pixels may include associated color information and intensity information. Color information may be represented in the form of one or more color schemes such as, but not limited to, RGB color scheme, CMYK color scheme, monochrome color scheme, grayscale color scheme, and/or the like. In some example embodiments, the intensity information may be representative of a brightness associated with each pixel. In some example embodiments, the pixel may further include depth information that may correspond to a distance of the point in the scene (represented by the pixel) from an image capturing device that captured the image. In an example embodiment, the image may be encoded and represented in one or more formats such as JPEG, Bitmap, PNG, RAW, and/or the like.

The term "package" as used herein may correspond to a physical item, parcel, object, element, device, or the like that is present in a scene that is captured by an image capturing device. For example, a warehouse or a retail outlet (e.g., a scene) may include packages, such as parcels, envelopes, cartons, shipping containers, and/or the like. In some examples, the package may correspond to a two-dimensional (2D) package and/or a three-dimensional (3D) package. In an example embodiment, the 3D package may correspond to a package that has three dimensions (e.g., height, width, and length). In an example embodiment, the 2D package may correspond to a 3D package where one of the dimensions (e.g., height) is negligible. Some examples of the 2D package may include, but are not limited to, a piece of paper, an envelope, etc.

The term "indicia" or "decodable indicia," as used in some examples herein, is intended to include any machine-readable indicia, including barcodes, QR codes, matrix codes, 1D barcodes, 2D barcodes, RFID tags, IR tags, near-field-communication (NFC) tags, photographs, UPC code, and characters that are readable by a computing device (for example, an indicia scanner). Indicia, are typically, graphical representations of information (e.g., data), such as product numbers, package tracking numbers, patient identification numbers, medication tracking identifiers, personnel identification numbers, etc.

In material handling environments, such as warehouses, and retail outlets, packages are palletized and those palletized packages are transferred from one location to another. Usually, the packages are palletized on a relocatable platform such as a pallet.

In some example scenarios, a plurality of pallets may be loaded simultaneously, which may result in a package being placed on the wrong pallet. In some cases and once the errant package is discovered, the pallet may have to be rebuilt. In other examples where the error is not identified, the package may ship to an incorrect location thereby increasing transportation times and/or costs.

The proximity of the pallets being simultaneously loaded likewise presents issues with respect to tracking or otherwise verifying package placement. In some examples, warehouse workers must individually scan and verify each package. In other examples, where a camera is used, the proximity of the pallets may result in false positives. That is, because a number of pallets may be in the field of view, the machine vision application may be unable to quickly and accurately discern whether a package is actually on a particular pallet.

Moreover, in some example scenarios and during palletizing of the packages, some of the packages protrude out from the periphery of the pallet due to some placement errors made by a worker or a robotic arm. Such packages may compromise the structural integrity of the palletized packages. For example, such packages may cause a shift in the center of gravity and/or center of mass of the palletized packages and may compromise the structural integrity of the palletized packages. Further, during transport of such palletized packages, the packages that protrude out from the periphery of the pallet may get damaged.

Systems and methods described herein are therefore configured to rely on an image capturing device to capture one or more two dimensional (2D) images to determine whether a package is on the correct pallet and/or whether the package protrudes from the periphery of the pallet. The example systems and methods, are configured to map or otherwise project the 2D captured image onto a three dimensional (3D) region that defines a volume, such as a 3D area representative of a pallet (i.e., the region that will filled with packages). Relying on the 3D region, the systems and methods described herein are configured to identify and scan decodable indicia within the 3D region. That is, the example embodiments herein are advantageously configured to determine whether a decodable indicia is inside or outside the 3D region. Moreover, the example systems and methods described herein rely on the captured one or more images to identify whether the package, bearing the decodable indicia, protrudes outside of 3D region.

Specifically, and in some example embodiments, the systems and methods described herein are configured to be installed in a material handling environment such as, but not limited to, a warehouse, a distribution facility and/or the like. The example system described herein includes an image capturing device that is configured to observe and/or otherwise capture one or more images of one or more operations performed in the warehouse. For example, the image capturing device may be configured to capture one or more images of a package palletizing operation.

In an example embodiment, the image capturing device is communicatively coupled with a computing device, one or more processors, or the like and is configured to control the operation of the image capturing device. For example, the computing device may cause the image capturing device to capture the one or more images of a corresponding field of view of the image capturing device.

In some examples, the captured image may include a package that has at least one decodable indicia attached on it or otherwise associated with it. For example, the package may have one or more decodable indicia printed on its one or more surfaces. Such indicia may have encoded identification information or other shipping information pertaining to the package, may have predefined shape (e.g., rectangle or square), and may have one or more predefined dimensions (e.g., length and width of the decodable indicia) or otherwise standardized dimensions. In some examples, information pertaining to the predefined shape and one or more predefined dimensions of the decodable indicia is pre-stored in a computing device.

In an example embodiment, the computing device may receive the one or more images from the image capturing device. Thereafter, the computing device may be configured to identify at least one decodable indicia in the image and determine one or more decodable indicia image coordinates. In an example embodiment, the one or more decodable indicia image coordinates correspond to 2D coordinates of the corners of the at least one decodable indicia in the captured image. Alternatively or additionally, the one or more decodable indicia image coordinates may correspond to a series of opposing points that are useable to identify the dimensions of the decodable indicia.

In an example embodiment, the computing device may transform the one or more decodable indicia image coordinates to the one or more decodable indicia spatial coordinates based on one or more parameters associated with the image capturing device. In an example embodiment, the one or more parameters associated with the image capturing device may include, but is not limited to, a focal length of the image capturing device, a distance of the image capturing device from the floor of the warehouse, the coordinates of optical center, a mount angle of the image capturing device, and/or the like.

In an example embodiment, the computing device may further define a 3D region within the field of view of the image capturing device. In some examples, the defined 3D region may correspond to a region in the 3D space within which the packages may be palletized. As such, to define the 3D region, in some examples, the computing device may identify the pallet in the corresponding field of view. Thereafter, the computing device may identify 3D region coordinates representing the base region of the 3D region (i.e., the position of corners or other opposing points of the pallet) in the 3D coordinate system and may define one or more virtual walls extending therefrom. In an example embodiment, the one or more virtual walls and the base region together define the 3D region in the field of view of the image capturing device and represent the area that may be filled by one or more palletized packages.

Alternatively or additionally, the 3D region may be defined using other methodologies. For example, in one example embodiment, the computing device may receive an input defining a 2D region in the captured image of the corresponding field of view of the image capturing device. The computing device may thereafter transform the one or more 2D region image coordinates of the defined 2D region to a first set of 3D region coordinates in the 3D coordinate system. The first set of 3D region coordinates define the base of the 3D region. In yet another example embodiment, the systems and methods herein may define the 3D region using one or more second decodable indicia that may be attached to the floor of the warehouse within the field of view of the image capturing device. In some examples, the one or more second decodable indicia may have information pertaining to the one or more 3D region coordinates that are usable to define the 3D region.

After defining the 3D region, the computing device may be configured to compare the one or more decodable indicia spatial coordinates with the one or more 3D region coordinates of the 3D region to determine whether the decodable indicia is within the 3D region. In an instance in which the indicia is within the defined 3D region, the computing device may determine that the package (on which the decodable indicia is printed) is also within the 3D region. Such determination of whether the package is on the pallet allows the computing device to differentiate between the packages that are on the pallet and other packages, which are within the field of view of the image capturing device, but are not on the pallet. Example systems and methods herein are configured to decode the decodable indicia associated with those packages on the pallet to confirm/deny that a package is on its intended pallet. In such an implementation, the computing device may be configured to identify the pallet based on decoding of another decodable indicia on the pallet, identify the pallet based on a user input, determine the pallet based on sequencing, identify the pallet based on an identifying characteristic, and/or the like. Thereafter, the computing device may be configured to retrieve a whitelist from a database based on the identified pallet. In an example embodiment, the whitelist may include information pertaining to the list of the packages that are intended to be on the pallet. The computing device may subsequently compare the information retrieved from the decodable indicia (attached to the package) with the whitelist to determine whether the package is on the intended pallet.

Alternatively or additionally, the computing device may be configured to define a package plane with respect to a package that is on the pallet. The package plane is coincident with a top surface of the package as it is based on the one or more decodable indicia spatial coordinates of the at least one decodable indicia. The package plane may intersect the one or more virtual walls at one or more intersection coordinates. In some examples, the one or more intersection coordinates may define a 3D region boundary for the package. Subsequently, the computing device may determine one or more package coordinates that represent corners of the package in the 3D coordinate system. Thereafter, the computing device may compare the one or more package coordinates with the one or more intersection coordinates (defining the 3D region boundary for the package) to determine whether a portion of the package protrudes outwardly from the 3D region boundary and, therefore protrudes outside of the pallet. In an instance in which the portion of the package protrude out from the 3D region, the computing device may generate a notification that may indicate to the worker operating in the warehouse to correctly place the protruding package on the pallet.

FIG. 1 illustrates a material handling environment 100, according to one or more embodiments described herein. The material handling environment 100 may refer to environments related to, but not limited to, manufacturing of the items, inventory storage of the items, packaging and unpackaging of the items, preparing customer orders, recording information based on scanning and identification of the items, and shipment processing (including shipping and logistics distribution of the items). In such environments, many workers and various electronic devices (e.g., robotic arm) operate in conjunction to perform various operations, which may involve handling of the items during various phases (including, but not limited to, accumulation, sorta-tion, scanning and identification, packaging and shipment preparation etc.), of the overall operation cycle of the material handling environment 100.

As illustrated in FIG. 1, the material handling environment 100 includes an image capturing device 102, a network 104, and a computing device 106. In an example embodiment, the image capturing device 102, and the computing device 106 are communicatively coupled with each other through the network 104.

The image capturing device 102 may correspond to an electronic device that is capable of generating an image based on light signals received from a corresponding field of view of the image capturing device 102. In some examples, the image capturing device 102 may be configured to generate an image based on reception of light signals in the visible light spectrum. The light signal received by the image capturing device 102 may correspond to a light generated by an illumination source on the image capturing device 102, may be ambient light, or may be from an external source.

In an example embodiment, the image capturing device 102 may further include a lens assembly (not shown) and a sensor assembly (not shown). The lens assembly may include one or more optical components, such as one or more lenses, diffusers, wedges, reflectors or any combination thereof, for directing the light signal on the sensor assembly. In an example embodiment, the sensor assembly includes an image sensor, such as a color or monochrome 1D or 2D CCD, CMOS, NMOS, PMOS, CID or CMD solid state image sensor, that may be configured to generate the image based on the received light signal.

In an example embodiment, the image capturing device 102 may be positioned in the material handling environment 100 in such a manner that the field of view of the image capturing device 102 may include at least one complete pallet (e.g., the pallet 114a) of the pallets 114a, 114b and 114c. In some examples, the image capturing device 102 may fixedly positioned on the ceiling 118 of the material handling environment 100.

Pallets 114a, 114b, and 114c correspond to a platform on which one or more packages 110 are stacked. In some examples, the pallets 114a, 114b, and 114c, may be placed on the floor 116 of the material handling environment 100. In an example embodiment, the one or more packages 110 may correspond to objects that are to be processed (e.g., for shipping and logistics) in the material handling environment 100.

In an example embodiment, decodable indicia 112 is attached to or otherwise associated with the package 110. In some examples, the decodable indicia 112 includes information pertaining to shipping destination of the corresponding package 110, identifying information, and/or the like. In an example embodiment, the decodable indicia 112 has a predefined shape (e.g., rectangular shape) and has a predefined length. In some examples, the predefined length value of the decodable indicia 112 is pre-stored in the computing device 106.

Alternatively or additionally, the field of view of the image capturing device 102 may include one or more second decodable indicia 120. In an example embodiment, the one or more second decodable indicia 120 may be attached to the floor 116 of the material handling environment 100. In some examples, the one or more second decodable indicia 120 may provide a reference information that locates or otherwise identifies pallet 114a within the material handling environment 100. The purpose of the one or more second decodable indicia 120 is further described in conjunction with FIGS. 12 and 13.

The network 104 may be any means, such as a device or circuitry, embodied in either hardware or a combination of hardware and software that is configured to receive and/or transmit data from/to various devices of the material handling environment 100 (e.g., the image capturing device 102 and the computing device 106). In this regard, the network 104 may include, for example, a network interface for enabling communications with a wired or wireless communication network. For example, the network 104 may include one or more network interface cards, antennae, buses, switches, routers, modems, and supporting hardware and/or software, or any other device suitable for enabling communications via a network. Additionally, or alternatively, the network 104 may include the circuitry for interacting with the antenna(s) to cause transmission of signals via the antenna(s) or to handle receipt of signals received via the antenna(s). Such signals may be transmitted using one or more communication protocols, such as Bluetooth® v1.0 through v3.0, Bluetooth Low Energy (BLE), infrared wireless (e.g., IrDA), ultra-wideband (UWB), induction wireless transmission, Wi-Fi, Near Field Communications (NFC), TCP/IP, UDP, 2G, 3G, 4G, 5G, Worldwide Interoperability for Microwave Access (WiMAX), or other proximity-based communications protocols.

Figure 2:
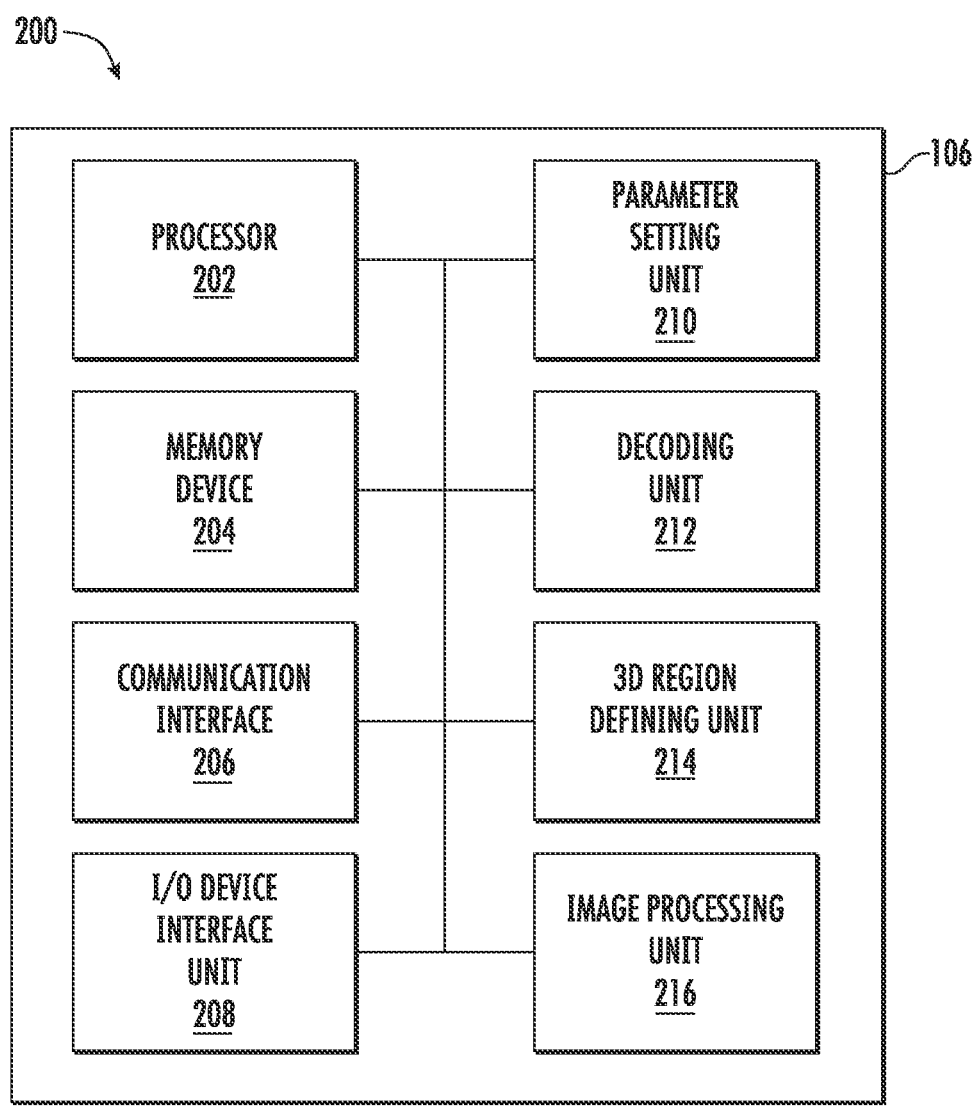
FIG. 2 illustrates a block diagram of an example computing device, according to one or more embodiments described herein.
Figure 3:
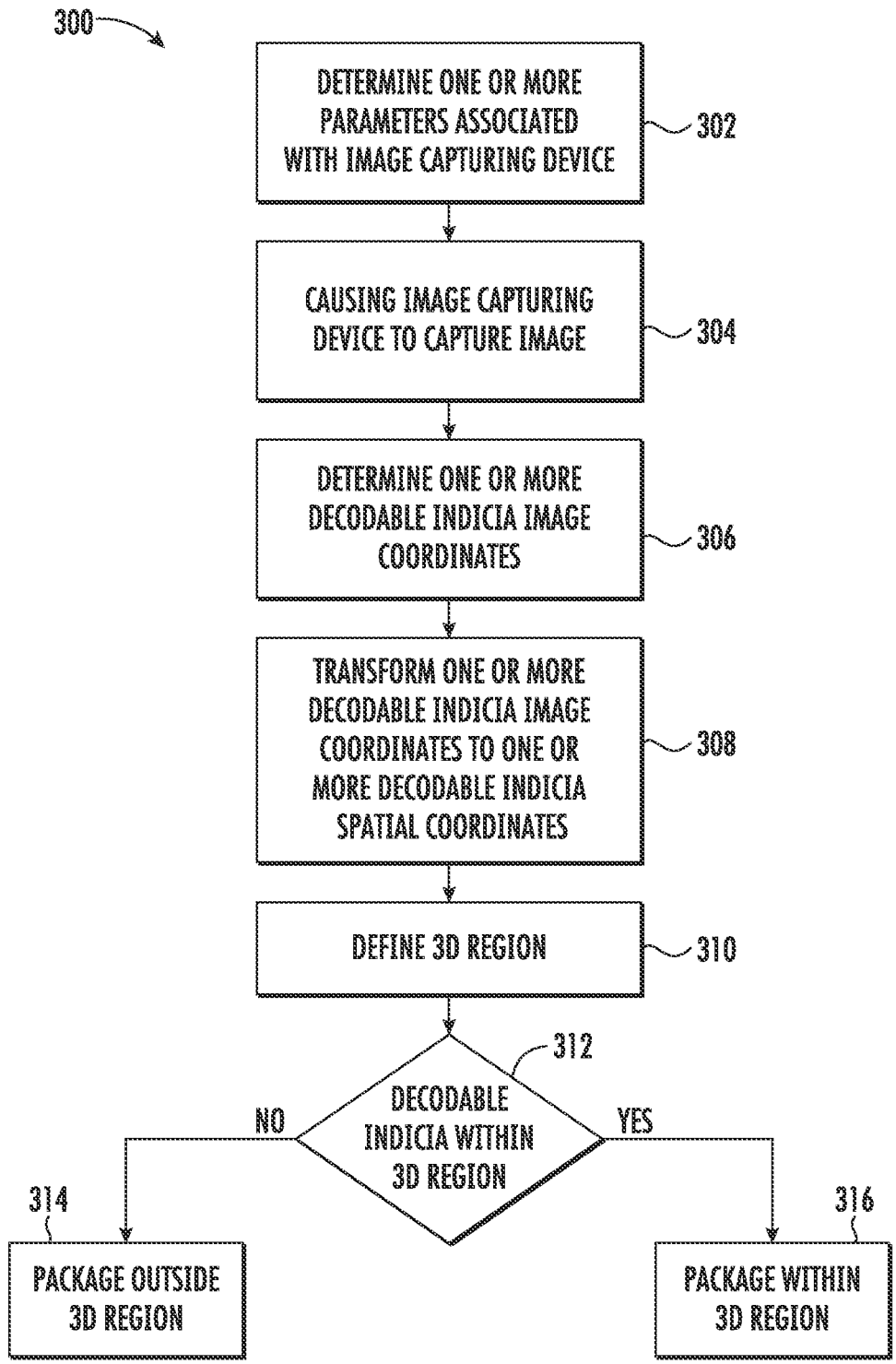
FIG. 3 illustrates a method for package processing in the material handling environment, according to one or more embodiments described herein.

The computing device 106, such as the computing device of FIG. 2, may include any means such as a device or circuitry embodied in either hardware or a combination of hardware and software that is configured to cause the image capturing device 102 to capture the image of field of view, as is further described in at least FIG. 3. Further, the computing device 106 may be configured to determine one or more decodable spatial indicia coordinates of the decodable indicia 112, as is further described in conjunction with at least FIG. 3. Additionally, the computing device 106 may be configured to define a 3D region within the field of view of the image capturing device 102, as is further described in conjunction with at least FIGS. 3, 9, 11, 12, and 13. Thereafter, the computing device 106 may be configured to compare the one or more decodable indicia spatial coordinates associated with the decodable indicia 112 with the defined 3D region to determine whether the corresponding package 110 is within the 3D region, as is further described in at least FIG. 3.

FIG. 2 illustrates a block diagram 200 of the computing device 106, according to one or more embodiments described herein. The computing device 106 includes a processor 202, a memory device 204, a communication interface 206, an I/O device interface unit 208, a parameters setting unit 210, a decoding unit 212, a 3D region defining unit 214, and an image processing unit 216. In an example embodiment, the processor 202 is communicatively coupled to each of the memory device 204, the communication interface 206, the I/O device interface unit 208, the parameter setting unit 210, the decoding unit 212, the 3D region defining unit 214, and the image processing unit 216.

The processor 202 may be embodied as means including one or more microprocessors with accompanying digital signal processor(s), one or more processor(s) without an accompanying digital signal processor, one or more coprocessors, one or more multi-core processors, one or more processors, processing circuitry, one or more computers, various other processing elements including integrated circuits such as, for example, an application specific integrated circuit (ASIC) or field programmable gate array (FPGA), or some combination thereof. Accordingly, although illustrated in FIG. 2 as a single processor, in an embodiment, the processor 202 may include a plurality of processors and signal processing modules. The plurality of processors may be embodied on a single electronic device or may be distributed across a plurality of electronic devices collectively configured to function as the circuitry of the computing device 106. The plurality of processors may be in operative communication with each other and may be collectively configured to perform one or more functionalities of the circuitry of the computing device 106, as described herein. In an example embodiment, the processor 202 may be configured to execute instructions stored in the memory device 204 or otherwise accessible to the processor 202. These instructions, when executed by the processor 202, may cause the circuitry of the computing device 106 to perform one or more of the functionalities, as described herein.

Whether configured by hardware, firmware/software methods, or by a combination thereof, the processor 202 may include an entity capable of performing operations according to embodiments of the present disclosure while configured accordingly. Thus, for example, when the processor 202 is embodied as an ASIC, FPGA or the like, the processor 202 may include specifically configured hardware for conducting one or more operations described herein. Alternatively, as another example, when the processor 202 is embodied as an executor of instructions, such as may be stored in the first memory device, the instructions may specifically configure the processor 202 to perform one or more algorithms and operations described herein.

Thus, the processor 202 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The memory device 204 may include suitable logic, circuitry, and/or interfaces that are adapted to store a set of instructions that is executable by the processor 202 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an embodiment, the memory device 204 may be integrated with the processor 202 on a single chip, without departing from the scope of the disclosure.

The communication interface 206 may correspond to a communication interface that may facilitate transmission and reception of messages and data to and from various components of the material handling environment 100. For example, the communication interface 206 is communicatively coupled with the image capturing device 102 through the network 104. Examples of the communication interface 206 may include, but are not limited to, an antenna, an Ethernet port, a USB port, a serial port, or any other port that can be adapted to receive and transmit data. The communication interface 206 transmits and receives data and/or messages in accordance with the various communication protocols, such as, I2C, TCP/IP, UDP, and 2G, 3G, 4G or 5G communication protocols.

The input/output (I/O) device interface unit 208 may include suitable logic and/or circuitry that may be configured to communicate with the one or more components of the computing device 106, in accordance with one or more device communication protocols such as, but not limited to, I2C communication protocol, Serial Peripheral Interface (SPI) communication protocol, serial communication protocol, Control Area Network (CAN) communication protocol, and 1-Wire® communication protocol. In an example embodiment, the I/O device interface unit 208 may communicate with display device (not shown) associated with the computing device 106 to display a GUI. In an alternative embodiment, the I/O device interface unit 208 may be configured to communicate with the image capturing device 102, without departing from the scope of the disclosure. Some examples of the input/output device interface unit 208 may include, but not limited to, a Data Acquisition (DAQ) card, an electrical drives driver circuit, and/or the like.

The parameter setting unit 210 may include suitable logic and/or circuitry that may enable the parameter setting unit 210 to receive an input from the worker in the material handling environment 100 pertaining to one or more parameters associated with the image capturing device 102, as is further described in FIG. 3. In an example embodiment, the one or more parameters associated with the image capturing device 102 includes, but is not limited to, a focal length of the image capturing device 102, a distance of the image capturing device 102 from the floor 116 of the material handling environment 100, and a mount angle of the image capturing device 102. In an example embodiment, the mount angle of the image capturing device 102 may correspond to an angle between a central axis of the image capturing device 102 and a plane representing the floor 116. In some examples, the parameter setting unit 210 may be configured to determine the one or more parameters associated with the image capturing device 102 automatically, as is further described in FIG. 3. In some embodiments, the parameter setting unit 210 may include a separate processor, specially configured Field Programmable Gate Array (FPGA), or Application Specific Integrated Circuit (ASIC).

The decoding unit 212 may include suitable logic and/or circuitry that may enable the decoding unit 212 to decode the decodable indicia 112, as is further described in conjunction with FIG. 3. Additionally, the decoding unit 212 may be configured to decode the one or more second decodable indicia 120 to retrieve one or more 3D region coordinates, as is further described in conjunction with FIG. 12. In some embodiments, the decoding unit 212 may include a separate processor, specially configured Field Programmable Gate Array (FPGA), or Application Specific Integrated Circuit (ASIC).

The 3D region defining unit 214 may include suitable logic and/or circuitry that may enable the 3D region defining unit 214 to define the 3D region within the field of view of the image capturing device 102, as is further described in FIG. 3. For example, the 3D region defining unit 214 may be configured to define the 3D region based on an input received from the worker through the GUI, as is further described in conjunction with FIG. 11. In another example, the 3D region defining unit 214 may be configured to defined the 3D region based on an identification of the pallet 114*a* within the field of view of the image capturing device 102, as is further described in conjunction with FIG. 9. In yet another example, the 3D region defining unit 214 may be configured to define the 3D region based on the one or more 3D region coordinates retrieved from the one or more second decodable indicia 120, as is further described in FIG. 12. In yet another embodiment, the 3D region defining unit 214 may be configured to define the 3D region based on second decodable indicia coordinates associated with the one or more second decodable indicia 120, as is further described in conjunction with FIG. 13. In some embodiments, the 3D region defining unit 214 may include a separate processor, specially configured Field Programmable Gate Array (FPGA), or Application Specific Integrated Circuit (ASIC).

The image processing unit 216 may include suitable logic and/or circuitry that may enable the image processing unit 216 to determine one or more decodable indicia image coordinates of the decodable indicia 112 in the captured image, as is further described in conjunction with FIG. 3. In an example embodiment, the one or more decodable indicia image coordinates corresponds to the coordinates in the 2D coordinate system. Further, the image processing unit 216 may be configured to transform the one or more decodable indicia image coordinates into one or more decodable indicia spatial coordinates, as is further described in FIGS. 3, 7, and 8.

In an example embodiment, the one or more decodable indicia spatial coordinates are deterministic of a position of the decodable indicia 112 in the defined 3D region. The image processing unit 216 is further configured to compare the one or more decodable indicia spatial coordinates with the one or more 3D region coordinates to determine whether the corresponding packages 110 is within the 3D region, as is further described in FIG. 3.

Figure 15:
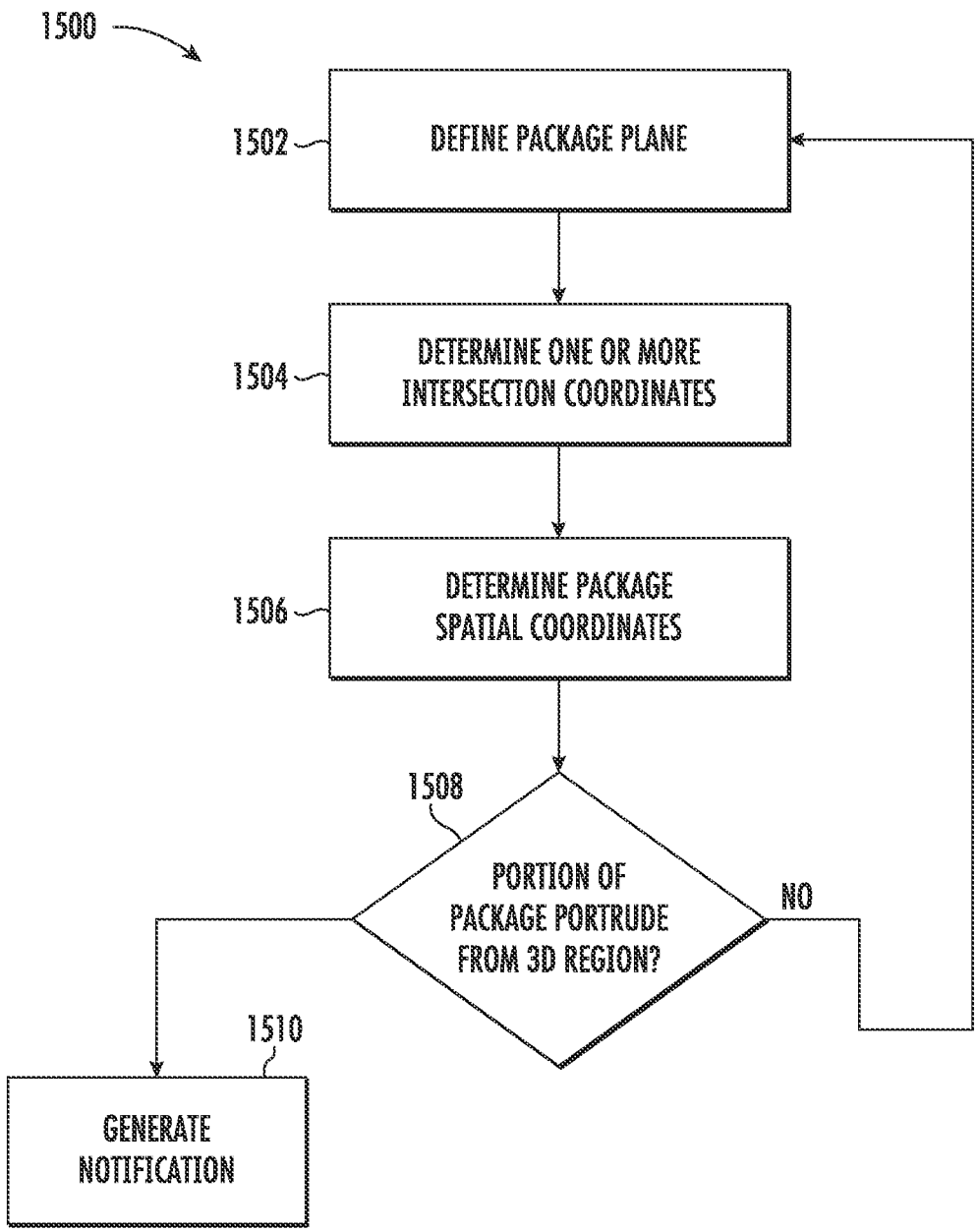
FIG. 15 illustrates a flowchart of a method for determining whether the portion of the packages within the 3D region protrude out from the 3D region, according to one or more embodiments described herein.

Alternatively or additionally, the image processing unit 216 may be configured to determine whether a portion of the package 110 protrude out from the 3D region, as is further described in conjunction with FIG. 15. In some embodiments, the image processing unit 216 may include a separate processor, specially configured Field Programmable Gate Array (FPGA), or Application Specific Integrated Circuit (ASIC).

The operation of the computing device 106 is further described in conjunction with FIG. 3. In some examples, the scope of the disclosure is not limited to the computing device 106 having the components mentioned in the FIG. 2. In alternative embodiment, the aforementioned components of the computing device 106 may be implemented in the image capturing device 102, without departing from the scope of the disclosure. Accordingly, image capturing device 102 may be configured to perform the operation of the computing device 106.

FIGS. 3, 5, 7, 8, 9, 11, 12, 13, and 15 illustrate example flowcharts of the operations performed by an apparatus, such as the computing device 106 of FIGS. 1 and 2, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations FIGS. 3, 5, 7, 8, 9, 11, 12, 13, and 15, when executed, convert a computer or processing circuitry into a particular machine configured to perform an example embodiment of the present invention. Accordingly, the operations of FIGS. 3, 5, 7, 8, 9, 11, 12, 13, and 15 define algorithms for configuring one or more computers or processors to perform various example embodiments. In some cases, a general purpose computer may be provided with an instance of the processor which performs the algorithms of FIGS. 3, 5, 7, 8, 9, 11, 12, 13, and 15 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

FIG. 3 illustrates a method for package processing in the material handling environment 100, according to one or more embodiments described herein.

At step 302, the computing device 106 includes means such as the processor 202, the I/O device interface unit 208, the parameters setting unit 210, and/or the like, for optionally determining the one or more parameters associated with the image capturing device 102. As discussed, the one or more parameters associated with the image capturing device 102 comprises, but is not limited to, the focal length of the image capturing device 102, the distance of the image capturing device 102 from the floor 116 of the material handling environment 100. In an example embodiment, the I/O device interface unit 208 may be configured to receive an input from the worker pertaining to the values of the one or more parameters associated with the image capturing device 102. For example, the I/O device interface unit 208 may be configured to display a Graphical User interface (GUI) to the worker on a display device (not shown). In some examples, the GUI may correspond to an input form through which the worker may provide the values of the one or more parameters. For instance, the worker may provide the input corresponding to the distance of the image capturing device 102 from the floor 116. Further, the worker may provide input corresponding to the focal length and/or the optical center of the image capturing device 102.

In some examples, the computing device 106 may determine the values of the one or more parameters associated with the image capturing device 102 automatically. For example, the image capturing device 102 may determine the distance between itself and the floor 116. In such an implementation, the image capturing device 102 may include a depth sensor (not shown) that may be configured to determine the distance of the floor 116 from the image capturing device 102. For instance, the computing device 106 may transmit an instruction to the image capturing device 102 through the network 104 to determine the distance between the image capturing device 102 and the floor 116. On receiving the instruction, the image capturing device 102 may utilize the depth sensor (not shown) to determine the distance between the image capturing device 102 and the floor 116. In some examples, the image capturing device 102 may utilize one or more of time of flight technique, structured light technique, and/or the like to determine the distance between the image capturing device 102 and the floor 116.

Alternatively or additionally, the parameter setting unit 210 may determine the distance between the image capturing device 102 and the floor 116 based on decoding of the one or more second decodable indicia 120. For example, the parameter setting unit 210 may instruct the decoding unit 212 to decode the one or more second decodable indicia 120. As discussed, the one or more second decodable indicia 120 may include the information pertaining to the one or more 3D region coordinates, therefore, on decoding of the one or more second decodable indicia 120, the decoding unit 212 determines the one or more 3D region coordinates. The one or more 3D region coordinates includes the value of the Z coordinates associated with each of the one or more second decodable indicia 120. In an example embodiment, the value of the Z coordinates associated with the one or more second decodable indicia 120 may correspond to the distance between the image capturing device 102 and the floor 116. In yet another alternative embodiment, the parameter setting unit 210 may instruct the processor 202 to capture an image of the field of view of the image capturing device 102. Thereafter, the parameter setting unit 210 may instruct the image processing unit 216 to determine the one or more second decodable indicia image coordinates of the one or more second decodable indicia 120 using the methodologies described below in at least step 306. Thereafter, the parameter setting unit 210 may be configured to transform the one or more second decodable indicia image coordinates to a first set of 3D region coordinates using the methodologies described below in the step 308. In an example embodiment, the first set of 3D region coordinates includes the value of the Z coordinates associated with each of the one or more second decodable indicia 120. In an example embodiment, the value of the Z coordinates associated with the one or more second decodable indicia 120 may correspond to the distance between the image capturing device 102 and the floor 116.

Further, the image capturing device 102 may determine the respective focal length based on pre-stored calibration information in the image capturing device 102. Usually, during manufacturing of the image capturing device 102, the manufacturer may perform calibration and accordingly store calibration information in the firmware of the image capturing device 102. In an instance in which the image capturing device 102 receives an instruction from the computing device 106 to determine focal length, the image capturing device 102 may retrieve the focal length value from the calibration information (pre-stored in the image capturing device 102) and may transmit the focal length value to the computing device 106.

In some examples, the scope of the disclosure is not limited to the one or more parameters including the distance of the image capturing device 102 from the floor 116, and the focal length of the image capturing device 102. In an example embodiment, the one or more parameters associated with the image capturing device 102 may further include a mount angle of the image capturing device 102. In an example embodiment, the mount angle of the image capturing device 102 may correspond to an angle between a central axis of the image capturing device 102 and a plane representing the floor 116. In an example embodiment, the I/O device interface unit 208 may receive the input pertaining to the value of the mount angle from the worker through the GUI.

At step 304, the computing device 106 includes means such as the processor 202, the I/O device interface unit 208, the communication interface 206, the image processing unit 216, and/or the like, for causing the image capturing device 102 to capture an image of the corresponding field of view. In an example embodiment, the image processing unit 216 may transmit an instruction to the image capturing device 102 through the communication interface 206. In alternative embodiment and in an instance in which the image capturing device 102 is directly coupled to the computing device 106, the image processing unit 216 may transmit the instruction to the image capturing device 102 through the I/O device interface unit 208. In an example embodiment, upon receiving the instruction, the image capturing device 102 may capture the image of the corresponding field of view. An example captured image is illustrated in FIG. 4.

Figure 4:
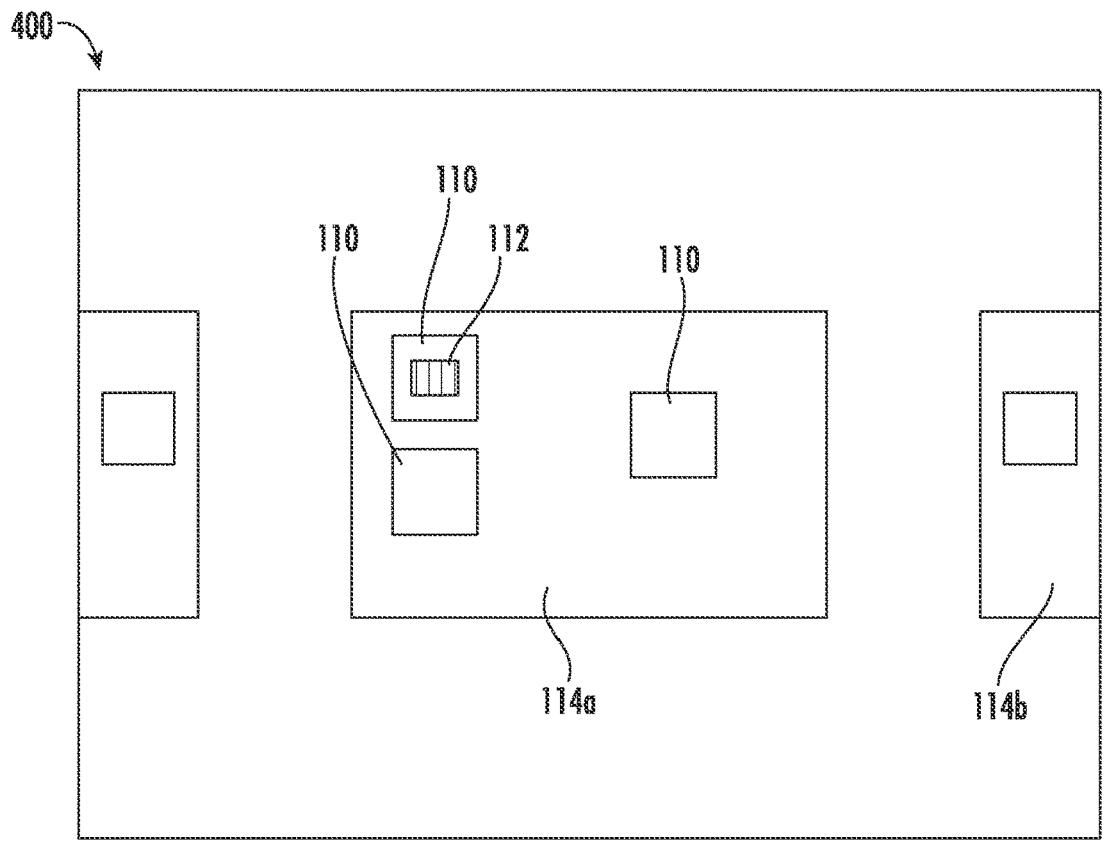
FIG. 4 illustrates an example captured image of the field of view of the image capturing device, according to the one or more embodiments described herein.

FIG. 4 illustrates an example captured image 400 of the field of view of the image capturing device 102, according to the one or more embodiments described herein. Referring to FIG. 1 and FIG. 4, as discussed supra, the field of view of the image capturing device 102 includes the one or more packages 110 with one or more associated decodable indicia 112, the pallet 114*a*, and a portion of the pallet 114*b*. Therefore, the captured image 400 likewise includes, in some examples, the one or more packages 110 with one or more associated decodable indicia 112, the pallet 114*a*, and the portion of the pallet 114*b*. As illustrated in FIG. 4, the decodable indicia 112 has a defined shape, such as but not limited to a rectangular, square shape, a circular shape, and/or the like.

Referring back to FIG. 3, in response to transmitting the instruction to the image capturing device 102, the image processing unit 216 receives the captured image from the image capturing device 102.

In some examples, the scope of the disclosure is not limited to the image processing unit 216 causing the image capturing device 102 to capture the image of the corresponding field of view. In alternative embodiment, the image capturing device 102 may be configured to operate independently. In such an implementation, the image capturing device 102 may be configured to capture the image of the corresponding field of view without receiving an explicit instruction from the image processing unit 216. To this end, the image capturing device 102 may capture the image of the corresponding field of view and may transmit the captured image to the computing device 106.

At step 306, the computing device 106 includes means such as the processor 202, the image processing unit 216, the decoding unit 212, and/or the like, for determining the one or more decodable indicia image coordinates of the decodable indicia 112 on each of the one or more packages 110. The determination of the one or more decodable indicia image coordinates of the decodable indicia 112 is further described in conjunction with FIG. 5.

Figure 5:
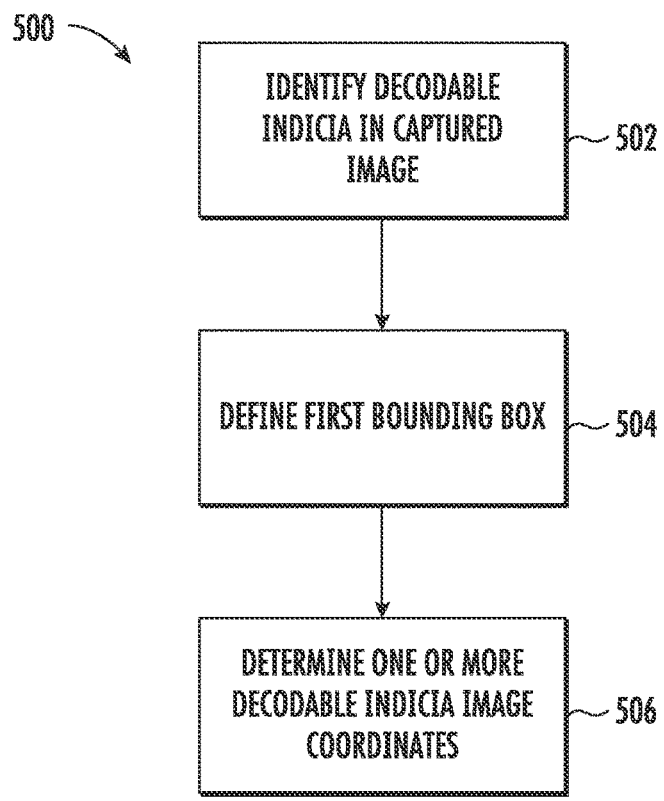
FIG. 5 illustrates a flowchart of a method for determining the one or more decodable indicia image coordinates of the decodable indicia, according to one or more embodiments described herein.

FIG. 5 illustrates a flowchart 500 of a method for determining the one or more decodable indicia image coordinates of the decodable indicia 112, according to one or more embodiments described herein.

At step 502, the computing device 106 includes means such as such as the processor 202, the image processing unit 216, the decoding unit 212, and/or the like, for identifying the decodable indicia 112 in the captured image. In an example embodiment, the image processing unit 216 may be configured to utilize one or more image processing techniques such as, but not limited to Hough transform, Gabor filtering, Scale Invariant Feature Transform (SIFT), and/or the like to identify the decodable indicia 112 in the captured image. In an example embodiment, the identification of the decodable indicia 112 involves identification of one or more pixels in the captured image that represent the decodable indicia. As discussed, each of the one or more packages 110 has attached or otherwise associated decodable indicia 112, therefore, the image processing unit 216 may be configured to detect the decodable indicia 112 on each of the one or more packages 110 in the captured image.

At step 504, the computing device 106 includes means such as the processor 202, the image processing unit 216, the decoding unit 212, and/or the like, for defining a first bounding box in the captured image that represent the boundary of the decodable indicia 112 in the captured image. To define the first bounding box, the image processing unit 216 may be configured to identify a set of pixels of the one or more pixels that are located at a periphery of the identified decodable indicia. Thereafter, the image processing unit 216 may determine the set of pixels that define the first bounding box of the decodable indicia 112. Additionally or alternatively, the image processing unit 216 may connect each of the set of pixels to define the first bounding box. Alternatively or additionally, the set of pixels may define a plurality of opposing pixels in the captured image sufficient to define the bounds of the first bounding box. In some examples, as discussed, the decodable indicia 112 has a rectangular shape. Therefore, the defined first bounding box likewise has a rectangular shape. In some examples, those skilled in the art would appreciate that the first bounding box may not have a perfect rectangular shape due to at least perspective projection of the image capturing device 102. In an example embodiment, the first bounding box may correspond to any polygon having four corners or other defined points. For the purpose of ongoing description, the first bounding box is considered to have a rectangular shape, without departing from or otherwise limiting the scope of the disclosure.

At step 506, the computing device 106 includes means such as the processor 202, the image processing unit 216, the decoding unit 212, and/or the like, for determining the one or more decodable indicia image coordinates based on the defined first bounding box. In some examples, to determine the one or more decodable indicia image coordinates, the image processing unit 216 may identify pixels of the set of pixels that define the first bounding box.

To determine the pixels of the set of pixels, the image processing unit 216 may be configured to determine the image coordinates of each pixel in the set of pixels representing the first bounding box. In an example embodiment, the image coordinates associated with the set of pixels is representative of the position of the first bounding box in the captured image. In an example embodiment, since the captured image corresponds to the 2D representation of the field of view of the image capturing device 102, therefore, the image coordinates associated with the set of pixels corresponds to coordinates in the 2D coordinate system. For example, a pixel of the set of pixels may be at a position of (2,3) in the captured image.

As discussed above, the first bounding box has rectangular shape. Therefore, in some examples, the image processing unit 216 may identify pixels of the set of pixels that satisfy following criteria as the one or more corners of the first bounding box:

TABLE 1

Criteria to identify pixels that define one or more corners of the first bounding box

| x coordinate value | y coordinate value |
| --- | --- |
| Minimum x coordinate value | Minimum y coordinate value |
| Minimum x coordinate value | Maximum y coordinate value |
| Maximum x coordinate value | Minimum y coordinate value |
| Maximum x coordinate value | Maximum y coordinate value |

The pixels that satisfy the criteria mentioned in the table 1 corresponds to the pixels that define the one or more corners of the first bounding box. Further, the image coordinates associated with the pixels correspond to the one or more decodable indicia image coordinates. In some examples, the scope of the disclosure is not limited to the criteria mentioned in the table 1. In alternative embodiment, the image processing unit 216 may determine the one or more decodable indicia image coordinates by determining equations of lines defining the periphery of the decodable indicia 112 (bounding box) and by determining the coordinates of the points where the one or more lines, defining the periphery of the decodable indicia 112, intersect. In an example embodiment, the coordinates of the intersection points correspond to the one or more decodable indicia image coordinates.

Figure 6:
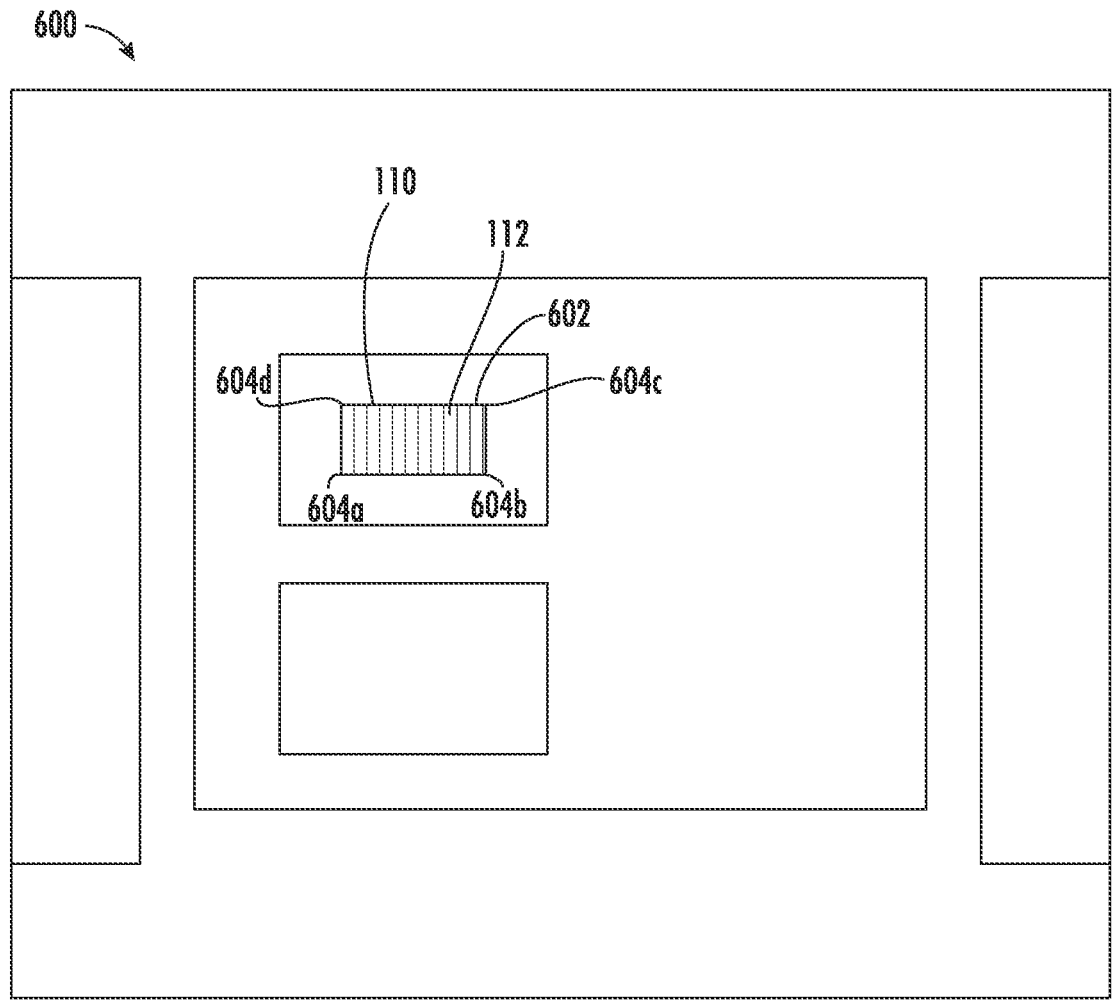
FIG. 6 illustrates the example captured image illustrating the identified decodable indicia, according to one or more embodiments described herein.

FIG. 6 illustrates the example captured image 600 illustrating the identified decodable indicia 112, according to one or more embodiments described herein. The example captured image 600 includes the identified decodable indicia 112 on the one or more packages 110. Further, the example captured image 600 illustrates the first bounding box 602 defined around each identified decodable indicia 112 in the captured image 600. The first bounding box 602 has the one or more corners 604a, 604b, 604c, and 604d. The image coordinates of the one or more corners 604a, 604b, 604c, and 604d correspond to the one or more decodable indicia image coordinates. For example, the image coordinates of the corner 604a is ($x_a$, $y_a$). Similarly, the image coordinates of the corners 604b, 604c, and 604d are ($x_b$, $y_b$), ($x_c$, $y_c$), and ($x_d$, $y_d$), respectively. Hereinafter, the one or more corners of first bounding box encompassing the decodable indicia have been interchangeably referred to as the one or more corners of the decodable indicia 112.

Referring back to FIG. 3, at step 308, the computing device 106 includes means such as the processor 202, the image processing unit 216, and/or the like, for transforming the one or more decodable indicia image coordinates (defined in the 2D dimensional coordinate system) to one or more decodable spatial coordinates in the 3D coordinate system. In an example embodiment, the 3D coordinate system corresponds to a coordinate system which is utilized to define the 3D space within the field of view of the image capturing device 102. Further, the 3D coordinate system is utilized to define the position of the objects (e.g., the one or more packages 110) in the 3D space. For example, the position of the image capturing device 102 in the 3D coordinate system is (0, 0, 0). In an example embodiment, as the one or more decodable indicia image coordinates correspond to the position of the one or more corners of the decodable indicia 112 in the captured image, therefore, the one or more decodable indicia spatial coordinates are deterministic of the position of the one or more corners of the decodable indicia 112 in the 3D space. The method of transforming the one or more decodable indicia image coordinates to the one or more decodable indicia spatial coordinates is further described in conjunction with FIG. 7. For the purpose of ongoing description, hereinafter, the coordinates in the 2D coordinate system are represented by lower case letters and the coordinates in the 3D coordinate system are represented by upper case letters.

Figure 7:
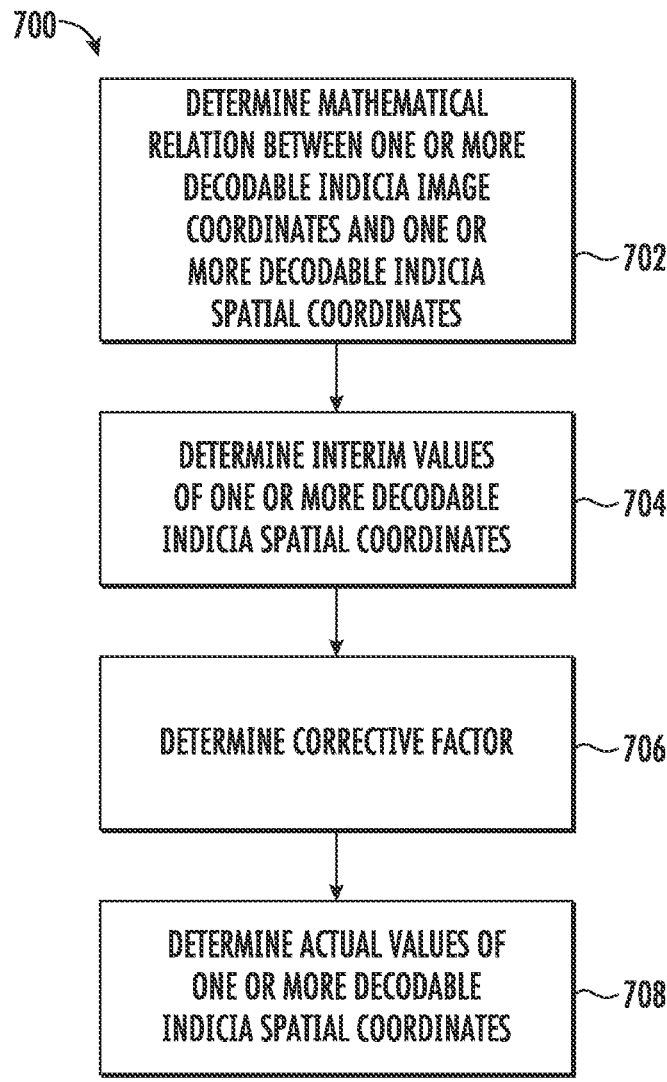
FIG. 7 illustrates a flowchart of a method for transforming the one or more decodable indicia image coordinates, according to one or more embodiments described herein.

FIG. 7 illustrates a flowchart 700 of a method for transforming the one or more decodable indicia image coordinates, according to one or more embodiments described herein.

At step 702, the computing device 106 includes means such as, the processor 202, the image processing unit 216, and/or the like, for determining a mathematical relation between the one or more decodable indicia spatial coordinates and the one or more decodable indicia image coordinates. The image processing unit 216 may be configured to utilizes the following perspective projection equation to define the mathematical relation between the one or more decodable indicia spatial coordinates and the one or more decodable indicia image coordinates:

$$x = \frac{Xf}{Z} \quad (1)$$

$$y = \frac{Yf}{Z} \quad (2)$$

Where,
x: x coordinates of the one or more corners of the first bounding box in 2D coordinate system;
y: y coordinates of the one or more corners of the first bounding box in 2D coordinate system;
f: Focal length of image capturing device 102;
X: X coordinates of the one or more corners of the first bounding box in the 3D coordinates system;
and
Y: Y coordinates of the one or more corners of the first bounding box in the 3D coordinates system;

Additionally, the image processing unit 216 utilizes the following equations illustrating mathematical relation amongst the one or mode decodable indicia spatial coordinates to determine the mathematical relation between the one or more decodable indicia spatial coordinates and the one or more decodable indicia image coordinates:

$$\begin{Bmatrix} X_B - X_A = X_D - X_C \\ Y_B - Y_A = Y_D - Y_C \\ Z_B - Z_A = Z_D - Z_C \end{Bmatrix} \quad (3)$$

Where,
Xa, Xb, Xc, and Xd: X coordinates of the one or more corners of the first bounding box in 3D coordinate system;
Ya, Yb, Yc, and Yd: Y coordinates of the one or more corners of the first bounding box in 3D coordinate system; and
Za, Zb, Zc, and Zd: Z coordinates of the one or more corners of the first bounding box in 3D coordinate system.

In an example embodiment, equation 3 represents a geometrical property of a rectangle. As discussed, the first bounding box encompassing the decodable indicia 112 has a rectangular shape. Hence, the image processing unit 216 utilizes the geometrical property, of a rectangle having opposite side of same length, to determine relationship amongst the one or more decodable indicia spatial coordinates (depicted by equation 3).

In some examples, the image processing unit 216 may be configured to modify equation 3 based on the perspective projection equations (i.e., equations 1 and 2). The modified equation 3 is illustrated below:

$$\begin{cases} x_b Z_B - x_a Z_A = x_d Z_D - x_c Z_C \\ y_b Z_B - y_a Z_A = y_d Z_D - y_c Z_C \\ Z_B - Z_A = Z_D - Z_C \end{cases} \quad (4)$$

In an example embodiment, the equation 4 represents the mathematical relation between the one or more decodable indicia spatial coordinates and the one or more decodable indicia image coordinates.

In some examples, the scope of the disclosure is not limited to the image processing unit 216 determining the mathematical relation in the step 702. In an example embodiment, the mathematical relation may be pre-stored in the computing device 106, without departing from the scope of the disclosure.

At step 704, the computing device 106 includes means such as, the processor 202, the image processing unit 216, and/or the like for determining interim values of the one or more decodable indicia spatial coordinates based on equation 4 and a predefined value of one of the Z coordinates. In some examples, the predefined value of one of the Z-coordinates corresponds to the distance of the image capturing device 102 from the floor 116 of the warehouse. In another example, the predefined value of one of the Z-coordinates corresponds to a predefined, a previously used, or otherwise random value. For example, the image processing unit 216 may consider the predefined value of ZA coordinate as 1000 mm. In other example embodiments, the ZA coordinate may be equal to a previously calculated Z coordinate value.

At step 706, the computing device 106 includes means such as, the processor 202, the image processing unit 216, and/or the like, for determining a corrective factor based on the predefined length of the decodable indicia 112. In an example embodiment, the corrective factor may correspond to a scale between the captured image and the 3D space within the field of view of the image capturing device 102. The determination of the corrective factor is further described in conjunction with FIG. 8.

Figure 8:
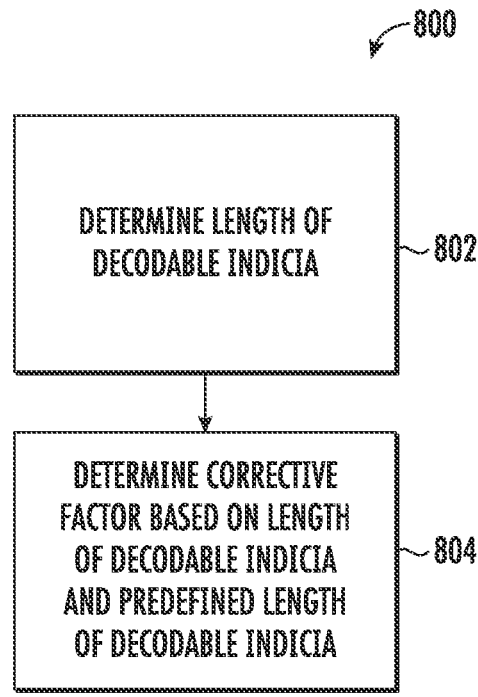
FIG. 8 illustrates a flowchart for determining the corrective factor, according to one or more embodiments described herein.

FIG. 8 illustrates a flowchart 800 for determining the corrective factor, according to one or more embodiments described herein.

At step 802, the computing device 106 includes means such as, the processor 202, the image processing unit 216, and/or the like for determining a length of decodable indicia 112 based on the interim values of the one or more decodable indicia spatial coordinates. For instance, the image processing unit 216 may be configured to utilize following equation to determine the length of the decodable indicia 112:

$$\text{Length} = \sqrt{(X_B - X_A)^2 + (Y_B - Y_A)^2 + (Z_B - Z_A)^2} \quad (5)$$

At step 804, the computing device 106 includes means such as, the processor 202, the image processing unit 216, and/or the like for determining the corrective factor based on the determined length of the decodable indicia 112 and the predefined length of the decodable indicia 112. In an example embodiment, the image processing unit 216 may be configured to determine a ratio between the determined length and the predefined length of the decodable indicia 112. In some examples, the ratio between the determined length and the predefined length of the decodable indicia 112 corresponds to the corrective factor.

For example, the one or more decodable indicia image coordinates of the one or more corners are (−47.7, −47.7), (−47.7, 47.7), (47.7, −47.7), and (47.7, 47.7). Further, assuming that the predefined value of ZA coordinate as 1000 mm, the image processing unit 216 may be configured to utilize the equations 4 and 5 to determine that length of the decodable indicia 112 as 40 mm. Considering that the predefined length of the decodable indicia 112 is 100 mm, the image processing unit 216 determines the corrective factor to be 2.5 (i.e., the ratio of determined length and the predefined length).

Referring back to FIG. 7, at step 708, the computing device 106 includes means such as the processor 202, the image processing unit 216, and/or the like, for determining actual values of the one or more decodable indicia spatial coordinates based on the interim values of the one or more decodable indicia spatial coordinates and the corrective factor. For example, the image processing unit 216 may be configured to determine the actual value of the one of the Z-coordinates based on the predefined value of the one of the Z-coordinate (e.g., the predefined value of the ZA in the step 802) and the corrective factor. More particularly, the image processing unit 216 may be configured to multiply the predefined value of the Z-coordinate (e.g., $Z_A$) with the corrective factor to obtain the actual value of the one of Z-coordinate (e.g., $Z_A$). Thereafter, the image processing unit 216 may be configured to determine the actual values of the one or more decidable indicia spatial coordinates by solving the equation 4 using the actual value of the one of the Z-coordinates (e.g., $Z_A$). For example, if the corrective factor determined is 2.5 and the predefined value of the Z-coordinate (e.g., $Z_A$) is 1000 mm, the actual value of the Z-coordinate (e.g., $Z_A$) is determined to be 2500 mm (i.e., 2.5 meters).

Alternatively or additionally, in an example embodiment, the image processing unit 216 may be configured to determine whether the actual value of one of the Z coordinate exceeds a threshold Z coordinate value, the image processing unit 216 may be configured to determine the Z coordinate value of other corner of the decodable indicia 112 as the Z coordinate value of the one of the Z coordinates (e.g., $Z_A$). In an example embodiment, such an assumption considers that when the decodable indicia 112 is far away from the image capturing device 102, the variation in the Z-coordinate values of the one or more corners of the decodable indicia 112 is negligible.

In some examples, the image processing unit 216 may be configured to utilize the methodologies described in the flowcharts 700 and 800 to determine the distance between the image capturing device 102 and the floor 116 using the one or more second decodable indicia 120 attached to the floor 116.

Referring back to FIG. 3, at step 310, the computing device 106 includes means such as the processor 202, the image processing unit 216, the 3D region defining unit 214, and/or the like, for defining the 3D region within the field of view of the image capturing device 102. The method of defining the 3D region within the field of view of the image capturing device 102 is described in conjunction with FIGS. 9-11.

Figure 9:
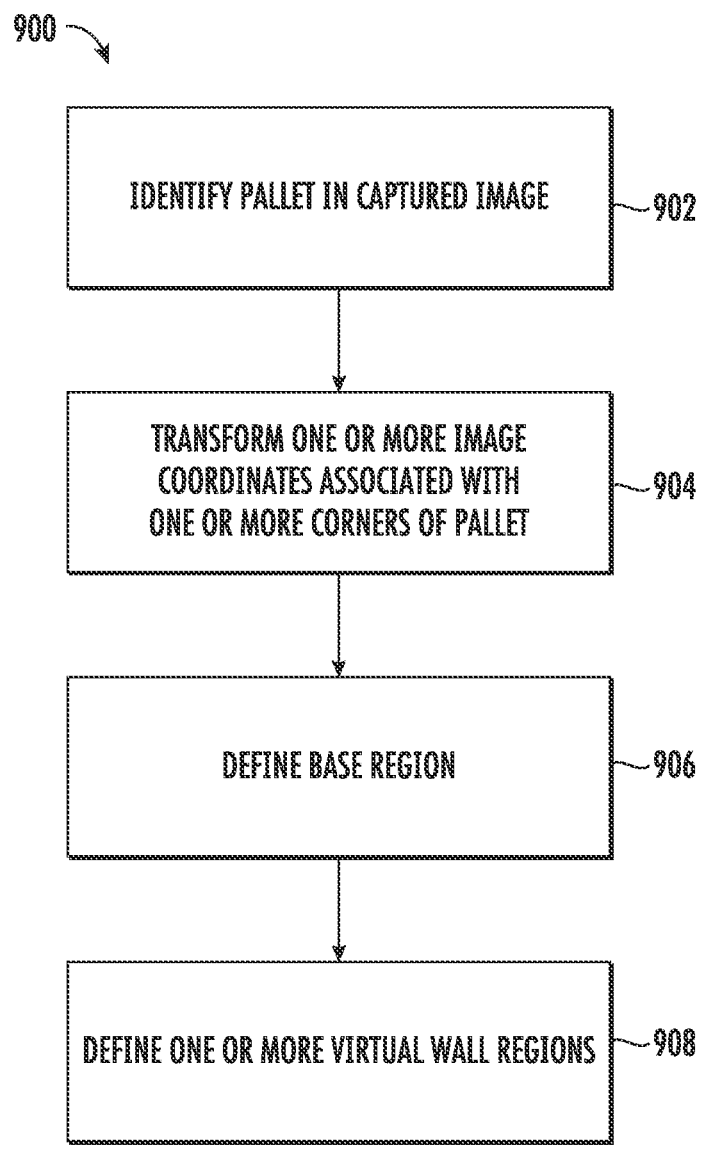
FIG. 9 illustrates a flowchart of a method for defining the 3D region within the field of view of the image capturing device, according to one or more embodiments described herein.

FIG. 9 illustrates a flowchart 900 of a method for defining the 3D region within the field of view of the image capturing device 102, according to one or more embodiments described herein.

At step 902, the computing device 106 includes means such as the processor 202, the image processing unit 216, the 3D region defining unit 214, and/or the like for identifying the pallet 114a in the captured image. As discussed, the captured image corresponds to an image of the field of view of the image capturing device 102. Further, since the field of view of the image capturing device 102 includes the pallet 114a, and a portion of the pallet 114b, the captured image includes the image of the pallet 114a and a portion of the pallet 114b.

In accordance with some example embodiments and to identify the pallet 114a in the captured image, the image processing unit 216 may utilize one or more object identification algorithms such as SIFT, Convolution Neural Network (CNN), and/or the like. Further, the image processing unit 216 may be configured to determine one or more image coordinates of the pixels that represent the corners of the pallet 114a. In an example embodiment, the image processing unit 216 may employ similar methods as described in the flowchart 500 to identify the pixels that represent the one or more corners of a second bounding box, encompassing the pallet 114a, and to determine the one or more image coordinates of the pixels. For example, the image processing unit 216 may be configured to define the second bounding box that encompasses a plurality of pixels representing the pallet 114a. In an example embodiment, the second bounding box may be represented by the set of pixels of the plurality of pixel representing the pallet 114a. In an example embodiment, the set of pixels of the plurality of pixels representing the pallet 114a may represent a periphery of the pallet 114a in the captured image.

The image processing unit 216 may be configured to identify the pixels that correspond to the one or more corners of the second bounding box (encompassing the pallet 114a) based on the image coordinates values associated with the set of pixels depicting the second bounding box encompassing the pallet 114a (for example, based on the criteria mentioned in the table 1). In an example embodiment, the one or more corners of the second bounding box correspond to the one or more corners of the pallet 114a in the captured image.

At step 904, the computing device 106 includes means such as the processor 202, the image processing unit 216, the 3D region defining unit 214, and/or the like for transforming the one or more image coordinates associated with the one or more corners of the pallet 114a to a first set of 3D region coordinates in the 3D coordinate system. In an example embodiment, the image processing unit 216 may utilize similar methodology as is described in the flowchart 700 and the flowchart 800 to determine the first set of 3D region coordinates of the pallet 114a in the 3D coordinate system. For example, since the pallet 114a has a rectangular shape, the image processing unit 216 may be configured to utilize equation 3 to determine the relation amongst the first set of 3D region coordinates. Further, the image processing unit 216 may be configured to utilize the perspective projection equations 1 and 2 to determine the X and Y coordinates of the one or more corners of the pallet 114a based on the values of the one or more image coordinates associated with the one or more corners of the pallet 114a and the focal length of the image capturing device 102. Since the pallet 114a is positioned on the floor 116 of the warehouse, therefore, the image processing unit 216 may utilize the distance between the image capturing device 102 and the floor 116 as the value of the Z coordinate in the equations 1 and 2 to determine the X and Y coordinates of the one or more corners of the pallet 114a in the 3D coordinate system.

At step 906, the computing device 106 includes means such as the processor 202, the image processing unit 216, the 3D region defining unit 214 and/or the like for defining a base region based on the first set of 3D region coordinates associated with the one or more corners of the pallet 114a. In an example embodiment, the 3D region defining unit 214 may define the base region by defining a base plane connecting the first set of 3D region coordinates associated with the one or more corners of the pallet 114a.

At step 908, the computing device 106 includes means such as the processor 202, the image processing unit 216, the 3D region defining unit 214 and/or the like for defining one or more virtual wall regions. In an example embodiment, the 3D region defining unit 214 may define a virtual wall region of the one or more virtual wall regions by defining a wall plane that extends from the base region to a position of the image capturing device 102 and is perpendicular to the base region. Further, the image processing unit 216 defines the wall plane (representing the wall region) in such a manner that the wall plane connects two 3D region coordinates in the first set of 3D region coordinates (representing the position of the one or more corners of the pallet 114a). In an example embodiment, the image processing unit 216 determines the defined wall plane as one of the one or more virtual wall regions. Similarly, the image processing unit 216 may be configured to define other virtual wall regions. In an example embodiment, each of the one or more virtual wall regions has a second set of 3D region coordinates that define a position of one or more corners of the one or more virtual wall regions. In an example embodiment, the image processing unit 216 may be configured to determine the second set of 3D region coordinates values based on the first set of 3D region coordinate value and the distance between the image capturing device 102 and the floor 116. For example, the image processing unit 216 determines that a value of the 3D region coordinate in the first set of 3D region coordinate is (1, 1, 0) and the distance between the image capturing device 102 and the floor 116 is 5 meters. Accordingly, the image processing unit 216 determines a 3D region coordinate in the second set of 3D region coordinate as (1, 1, 5). In an example embodiment, the image processing unit 216 may configured to consider the base region and the one or more virtual wall regions as the 3D region.

In some examples, the base region of the 3D region has a rectangular or square shape and the one or more wall regions of the 3D region are perpendicular to the base region. As such, the defined 3D region has cuboidal shape. In an example embodiment, the defined 3D region has one or more 3D region coordinates that corresponds to the one or more corners of the 3D region (e.g., the one or more corners of the cuboidal 3D region). In an example embodiment, the one or more 3D region coordinates includes the first set of 3D region coordinates (representing the one or more corners of the base region) and the second set of 3D region coordinates (representing the one or more corners of the one or more virtual wall regions). An example 3D region is illustrated in FIG. 10.

Figure 10:
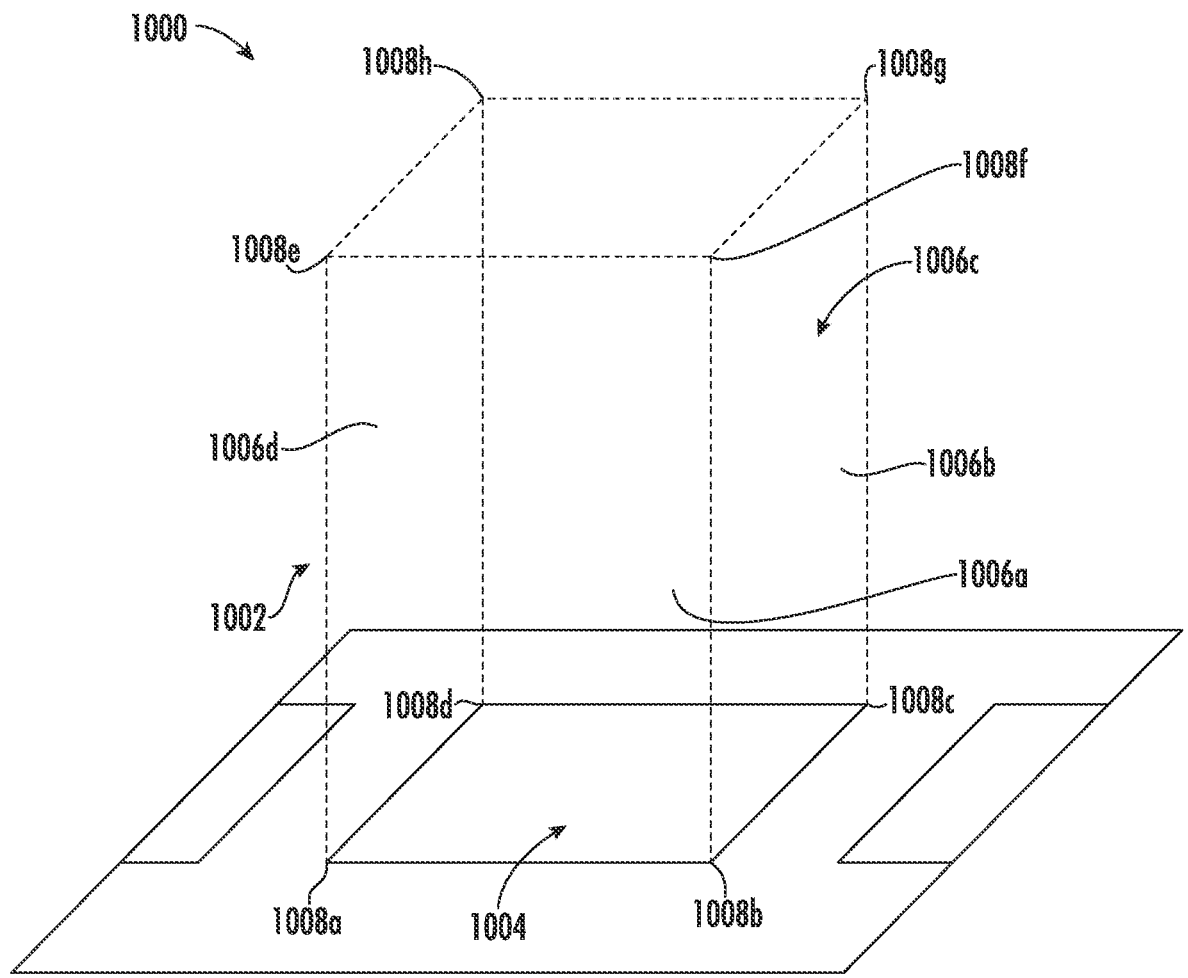
FIG. 10 illustrates a schematic depicting the 3D region and the field of view of the image capturing device, according to one or more embodiments described herein.

FIG. 10 illustrates a schematic 1000 depicting the 3D region 1002 and the field of view of the image capturing device 102, according to one or more embodiments described herein. The 3D region 1002 has the base region 1004 and the one or more virtual wall regions 1006a, 1006b, 1006c, and 1006d. Further, the 3D region 1002 has the one or more corners depicted by 1008a, 1008b, 1008c, . . . , 1008h (hereinafter referred to as the one or more corners 1008).

In some examples, the scope of the disclosure is not limited to defining the 3D region as is described in the flowchart 900. An alternate method of defining the 3D region is further described in conjunction with FIG. 11, FIG. 12, and FIG. 13.

Figure 11:
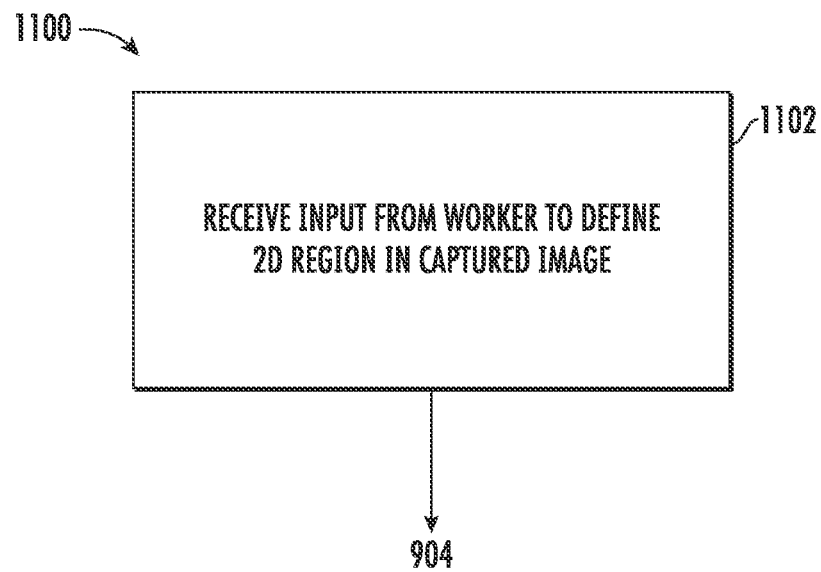
FIG. 11 illustrates a flowchart of a method for defining the 3D region, according to one or more embodiments described herein.

FIG. 11 illustrates a flowchart 1100 of a method for defining the 3D region, according to one or more embodiments described herein.

At step 1102, the computing device 106 includes means such as the processor 202, the image processing unit 216, the 3D region defining unit 214, and/or the like for receiving an input from the worker to define a 2D region in the captured image. To enable the worker to define the 2D region in the captured image, the I/O device interface unit 208 may be configured to display the captured image on the GUI. Further, the I/O device interface unit 208 may be configured to receive the input from the worker, through the GUI, defining the 2D region in the captured image. For instance, the worker may draw a rectangle in the captured image to define the 2D region in the captured image.

Thereafter, the 3D region defining unit 214 may be configured to follow method described in the step 904 through 908 to define the 3D region based on the defined 2D region in the captured image. For instance, the 3D region defining unit 214 may be configured to transform the one or more image coordinates associated with the one or more corners of the defined 2D region to the first set of 3D region coordinates in the 3D coordinate system (as is described in the step 904). Thereafter, the 3D region defining unit 214 may be configured to define the base region, as is described in the step 906. Subsequently, the 3D region defining unit 214 may be configured to define the one or more virtual wall regions, as is described in the step 908.

The scope of the disclosure is not limited to defining the 3D region based on the identification of the pallet 114a and/or the input corresponding to defining the 2D region in the captured image. Alternatively or additionally, the 3D region may be defined based on the location and/or the content of the one or more second decodable indicia 120 attached to the floor 116 of the warehouse. Such methods of defining the 3D region based on the one or more second decodable indicia 120 is described on conjunction with FIGS. 12 and 13.

Figure 12:
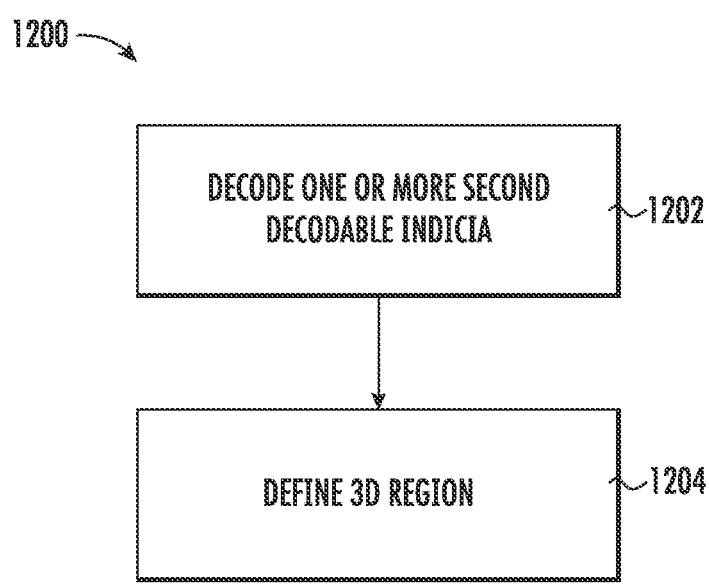
FIG. 12 illustrates another flowchart of a method for defining the 3D region, according to one or more embodiments described herein.

FIG. 12 illustrates another flowchart 1200 of a method for defining the 3D region, according to one or more embodiments described herein.

At step 1202, the computing device 106 includes means such as the processor 202, the decoding unit 212, the image processing unit 216, the 3D region defining unit 214, and/or the like for decoding the one or more second decodable indicia 120. In an example embodiment, the decoding unit 212 may be configured to identify the one or more second decodable indicia 120 from the captured image. Thereafter, the decoding unit 212 may be configured to decode the one or more second decodable indicia 120 to retrieve the information encoded in the one or more decodable indicia 112. In an example embodiment, the encoded information may include information pertaining to the one or more 3D region coordinates. As discussed, the one or more 3D region coordinates corresponds to the position of the one or more corners of the 3D region.

At step 1204, the computing device 106 includes means such as the processor 202, the decoding unit 212, the image processing unit 216, the 3D region defining unit 214, and/or the like for defining the 3D region based on the one or more 3D region coordinates.

Figure 13:
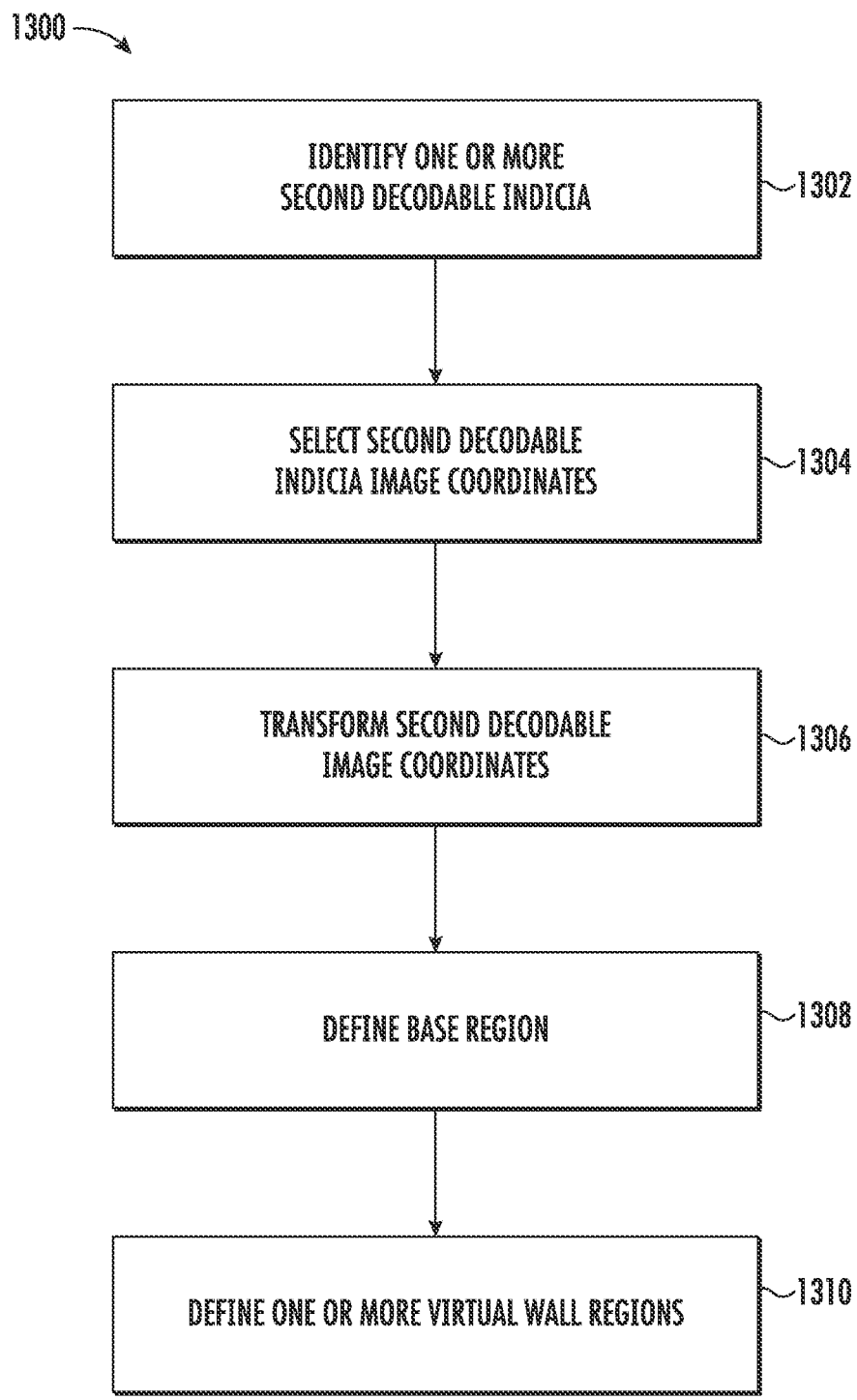
FIG. 13 illustrates another flowchart of a method for defining the 3D region based on the one or more second decodable indicia, according to one or more embodiments described herein.

FIG. 13 illustrates another flowchart 1300 of a method for defining the 3D region based on the one or more second decodable indicia, according to one or more embodiments described herein.

At step 1302, the computing device 106 includes means such as the processor 202, the decoding unit 212, the image processing unit 216, the 3D region defining unit 214, and/or the like for identifying each of the one or more second decodable indicia 120 in the captured image. In an example embodiment, the image processing unit 216 may be configured to utilize the methodologies described in at least step 502 to identify the one or more second decodable indicia 120 in the captured image.

Additionally, the image processing unit 216 may be configured to define a third bounding box for each of the one or more second decodable indicia 120, as is described in the step 504.

Thereafter, the image processing unit 216 may be configured to determine the one or more second decodable indicia image coordinates for each of the one or more second decodable indicia 120 based on the defined third bounding box, as is described in the step 506. In an example embodiment, the one or more second decodable indicia image coordinates associated with each of the one or more second decodable indicia 120 represent the one or more corners of the one or more second decodable indicia 120.

At step 1304, the computing device 106 includes means such as the processor 202, the decoding unit 212, the image processing unit 216, the 3D region defining unit 214, and/or the like for selecting the second decodable indicia image coordinates of the one or more second decodable indicia image coordinates for each of the one or more second decodable indicia 120. In an example embodiment, the image processing unit 216 may be configured to randomly select one of the one or more corners for each of the one or more second decodable indicia 120. Thereafter, the image processing unit 216 may be configured to consider the second decodable indicia image coordinates associated with the selected corner as the second decodable indicia image coordinate of the respective second decodable indicia 120.

At step 1306, the computing device 106 includes means such as the processor 202, the decoding unit 212, the image processing unit 216, the 3D region defining unit 214, and/or the like for transforming the second decodable indicia image coordinates associated with each of the one or more second decodable indicia 120 to the first set of 3D region coordinates. In an example embodiment, the image processing unit 216 may be configured to utilize the equation 1 through 4 to transform the second decodable indicia image coordinates associated with each of the one or more second decodable indicia 120 to the first set of 3D region coordinates. In some examples, the first set of 3D region coordinates are deterministic of the position of the one or more respective second decodable indicia 120 in the 3D space. In some examples, during determination of the first set of 3D region coordinates, the image processing unit 216 may be configured to utilize the distance between the image capturing device 102 and the floor 116 as the value of the Z-coordinate to solve the equations 1 through 4 (since the one or more second decodable indicia 120 are attached to the floor 116116).

At step 1308, the computing device 106 includes means such as the processor 202, the decoding unit 212, the image processing unit 216, the 3D region defining unit 214, and/or the like for defining the base region based on the first set 3D region coordinates associated with each of the one or more second decodable indicia 120. In an example embodiment, the 3D region defining unit 214 may utilize similar methodology as is described in the step 906 to define the base region.

At step 1310, the computing device 106 includes means such as the processor 202, the decoding unit 212, the image processing unit 216, the 3D region defining unit 214, and/or the like for defining the one or more virtual wall regions. In an example embodiment, the 3D region defining unit 214 may utilize similar methodologies as is described in the step 908 to define the one or more virtual wall regions. As discussed, the base region and the one or more wall region together correspond to the 3D region.

Referring back to FIG. 3, at step 312, the computing device 106 includes means such as the processor 202, the image processing unit 216, and/or the like for comparing each of the one or more decodable indicia spatial coordinates with each of the one or more 3D region coordinates to determine whether the corresponding decodable indicia 112 is within the 3D region. To determine the whether the corresponding decodable indicia 112 is within the 3D region, the image processing unit 216 may be configured to determine X coordinate range, Y coordinate range, and Z coordinate range of the 3D region. In an example embodiment, the image processing unit 216 may be configured to determine the X coordinate range, the Y coordinate range, and the Z coordinate range based on the one or more 3D region coordinates of the 3D region. For example, to determine the X coordinate range, the image processing unit 216 determines a minimum X coordinate value and a maximum X coordinate value amongst the one or more 3D region coordinates. Thereafter, image processing unit 216 determines the X coordinate range as minimum X coordinate value to maximum X coordinate value. Similarly, the image processing unit 216 determines that Y coordinate range and the Z coordinate range. In some examples, the system may define an X coordinate range and Y coordinate range for a particular Z coordinate value.

Thereafter, the image processing unit 216 may be configured to compare each of the one or more decodable indicia spatial coordinates with the X coordinate range, the Y coordinate range, and the Z coordinate range. If X coordinate value, Y coordinate value, and the Z coordinate value of each of the one or more decodable indicia spatial coordinates lie within the X coordinate range, the Y coordinate range, and the Z coordinate range, respectively, the image processing unit 216 determines that the decodable indicia 112 is within the 3D region. However, if image processing unit 216 determines that at least one of X coordinate value, the Y coordinate value, and the Z coordinate value of at least one of the one or more decodable indicia spatial coordinates lie outside the X coordinate range, the Y coordinate range, and the Z coordinate range, the image processing unit 216 determines that the decodable indicia 112 is outside the 3D region. The comparison of the one or more decodable indicia spatial coordinates with the one or more 3D region coordinates is further described in conjunction with FIG. 14.

In alternative embodiment, the image processing unit 216 compares each of the one or more decodable indicia spatial coordinates with the minimum X coordinate value, the maximum X coordinate value, the minimum Y coordinate value, the maximum Y coordinate value, the minimum Z coordinate value, and the maximum Z coordinate value to determine whether decodable indicia 112 is within the 3D region. For example, the image processing unit 216 determines whether the one or more decodable indicia spatial coordinates satisfy conditions illustrated in the following equations to determine whether the decodable indicia 112 is within the 3D region.

$$X_{min} < X < X_{max} \quad (5)$$

$$Y_{min} < Y < Y_{max} \quad (6)$$

$$Z_{min} < Z < Z_{max} \quad (7)$$

In an example embodiment, in an instance in which the image processing unit 216 determines that each of the one or more decodable indicia spatial coordinates satisfies the conditions illustrated in the equations 5-7, the image processing unit 216 determines that the decodable indicia 112 is within the 3D region. However, in an instance in which the image processing unit 216 determines at least one the one or more decodable indicia spatial coordinates does not satisfy at least one of the conditions illustrated in the equations 5-7, the image processing unit 216 determines that the decodable indicia 112 is outside the 3D region.

In an instance in which the image processing unit 216 determines that the decodable indicia 112 is outside the 3D region, the processor 202 is configured to perform the step 314. However, in an instance in which the image processing unit 216 determines that the decodable indicia 112 is within the 3D region, the processor 202 is configured to perform the step 316.

At step 314, the computing device 106 includes means such as the processor 202, the image processing unit 216, and/or the like for determining that the package 110 (having the decodable indicia 112) is outside the 3D region. At step 316, the computing device 106 includes means such as the processor 202, the image processing unit 216, and/or the like for determining that the package 110 (having the decodable indicia 112) is within the 3D region.

In an example embodiment, the computing device 106 may perform further operation only on those packages 110 that lie within the 3D region. For instance, the computing device 106 may be configured to decode the decodable indicia 112 for only those packages 110 that lie within the 3D region. In another example, since the 3D region is defined to be a region on the pallet 114a, therefore, in some examples, the computing device 106 may consider the packages 110 within the 3D region as palletized packages on the pallet 114a. Remaining packages 110 that are outside the 3D region are not considered as palletized packages.

Figure 14:
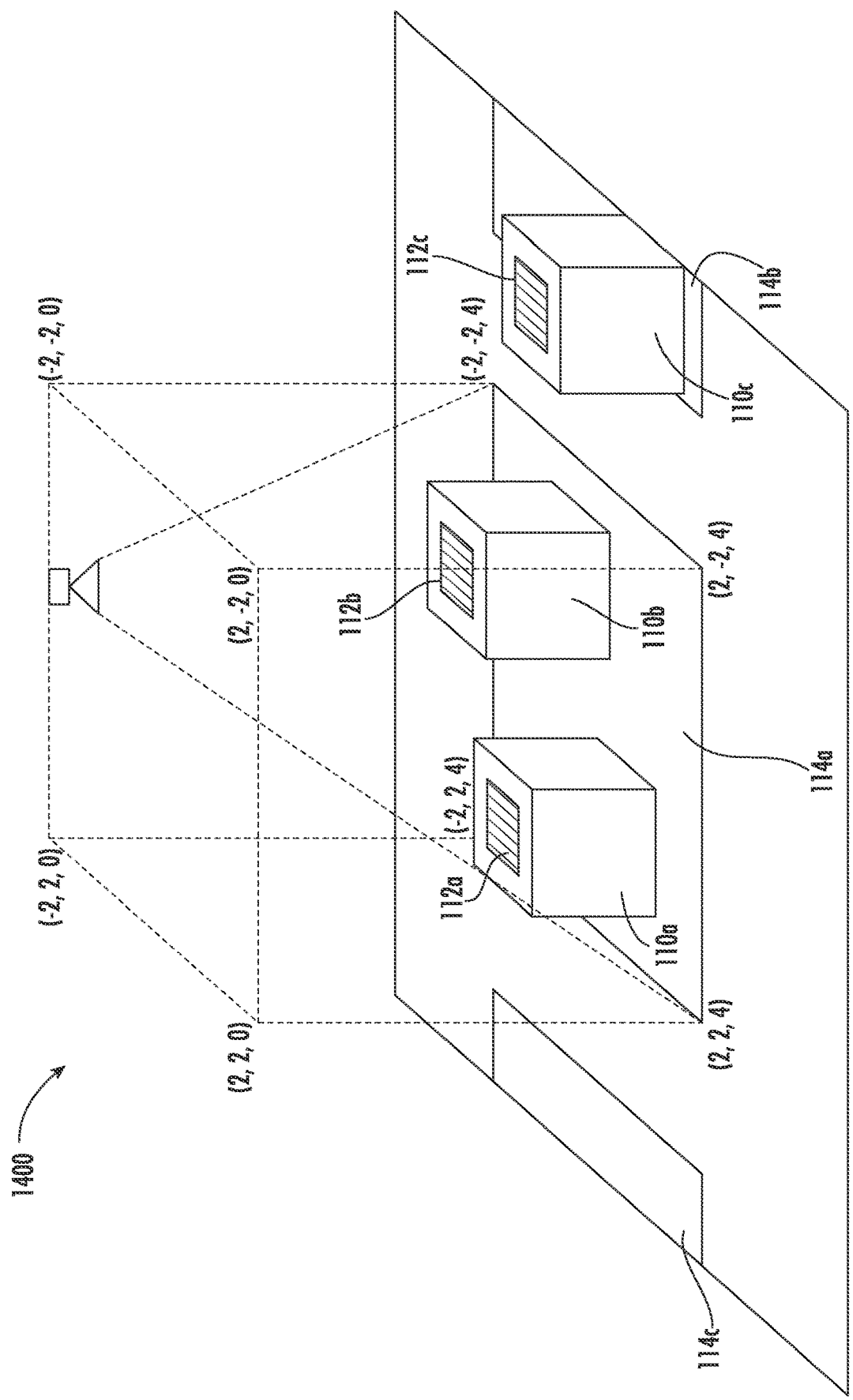
FIG. 14 illustrates an example environment depicting the 3D region and the packages, according to one or more embodiments described herein.

FIG. 14 illustrates an example environment 1400 depicting the 3D region 1402 and the packages 110, according to one or more embodiments described herein.

The example environment 1400 includes the pallets 114a, 114b, and 114c. Further, the example environment 1400 depicts that packages 110a and 110b are placed on the pallet 114a, while the package 114c is placed on the pallet 114b. Each of the packages 110a, 110b, and 110c has attached decodable indicia 112a, 112b, and 112c. Each of the attached decodable indicia 112a, 112b, and 112c has decodable indicia spatial coordinates. For example, following table illustrates decodable indicia spatial coordinates values for each of the attached decodable indicia 112a, 112b, and 112c:

TABLE 2

Spatial coordinates associated with the decodable indicia 112a, 112b, and 112c

| Decodable indicia | Spatial coordinates |
| --- | --- |
| Decodable indicia 112a | (1, 1, 3), (1, −1, 3), (−1, 1, 3), (−1, −1, 3) |
| Decodable indicia 112b | (1, 1, 3), (1, 0, 3), (0, 1, 3), (0, 0, 3) |
| Decodable indicia 112c | (10, 11, 3), (10, 13, 3), (13, 11, 3), (13, 13, 3) |

Further, the 3D region 1402 has one or more 3D region coordinates 1404a 1404b, 1404h. Following table depicts the values of the one or more 3D region coordinates:

TABLE 3

3D region coordinates of the 3D region 1402

| One or more 3D region coordinates | Value of 3D region coordinates |
| --- | --- |
| 3D region coordinate 1404a | (2, 2, 4) |
| 3D region coordinate 1404b | (2, −2, 4) |
| 3D region coordinate 1404c | (−2, 2, 4) |
| 3D region coordinate 1404d | (−2, −2, 4) |
| 3D region coordinate 1404e | (2, 2, 0) |
| 3D region coordinate 1404f | (2, −2, 0) |
| 3D region coordinate 1404g | (−2, 2, 0) |
| 3D region coordinate 1404h | (−2, −2, 0) |

In an example embodiment, as discussed in the step 313, the image processing unit 216 may be configured to determine the X coordinate range of the 3D region 1402 as −2 to 2. Further, the image processing unit 216 determines the Y coordinate range and the Z coordinate range as −2 to 2 and 0 to 4, respectively. Thereafter, the image processing unit 216 determines whether each of the one or more decodable indicia spatial coordinates is within the X coordinate range, Y coordinate range, and Z coordinate range. For example, the image processing unit 216 determines that the decodable indicia coordinate (1, 0, 3) of the decodable indicia 112b is within the 3D region as the X coordinate value "1" of the decodable indicia coordinate (of the decodable indicia 112b) is within the X coordinate range of −2 to 2. Similarly, the Y coordinate value and the Z coordinate value of "0" and "3" are also with the Y coordinate range and the Z coordinate range, respectively. Similarly, image processing unit 216 determines that other decodable indicia spatial coordinates of the decodable indicia 112b are also within the X coordinate range, Y coordinate range and the Z coordinate range. Accordingly, the image processing unit 216 determines that the decodable indicia 112b is within the 3D region 1402. Similarly, the image processing unit 216 determines that the decodable indicia 112a is also within the 3D region 1402 as the X coordinate value, Y coordinate value, and the Z coordinate value each of the one or more decodable indicia spatial coordinates lie within the X coordinate range, the Y coordinate range, and the Z coordinate range of the 3D region 1402. Additionally, the image processing unit 216 determines that the decodable indicia 112c is outside the 3D region 1402.

In some examples and for the packages determined as being within the 3D region, the computing device 106 may determine whether the package is intended to be on the pallet 114a. In such an application, the computing device 106 may be configured to determine a unique code or other identification associated with the pallet 114a. In an example embodiment, the computing device 106 may be configured to retrieve the unique code associated with the pallet from a third decodable indicia (not shown) on the pallet 114a. Thereafter, the computing device 106 may be configured to retrieve a whitelist associated with the unique code from a database server (not shown). The whitelist may include a list of packages that are intended to be on the pallet 114a. In an example embodiment, the computing device 106 may be configured to cross reference the information retrieved from the decodable indicia 112 (attached on the package 110) with the whitelist to determine whether the package 110 is intended to be on the pallet 114a. If the computing device 106 determines that the package 110 is not intended to be on the pallet 114a, the computing device 106 may generate an alarm. In another example, once the computing device 106 identifies the packages 110 that are within the 3D region, the computing device 106 determines whether a portion of the packages 110 (that are within the 3D region) protrude out from the 3D region. One such method of determine whether the portion of the packages 110 protrude out from the 3D region.

FIG. 15 illustrates a flowchart 1500 of a method for determining whether the portion of the packages 110 within the 3D region protrude out from the 3D region, according to one or more embodiments described herein.

At step 1502, the computing device 106 includes means such as the processor 202, the image processing unit 216, and/or the like, for defining a package plane corresponding to each package 110 within the 3D region. To define the package plane for the package 110, the image processing unit 216 may be configured to retrieve the one or more decodable indicia spatial coordinates associated with the decodable indicia 112 attached to the respective package 110. Thereafter, the image processing unit 216 may be configured to define the package plane in the 3D coordinate system such that the package plane passes through at least three of the one or more decodable indicia spatial coordinates. Since the decodable indicia 112 is formed on the surface of the package 110, therefore, the package plane defined to pass at least three of the one or more decodable indicia spatial coordinates also passes through a surface of the package 110. In some examples and in an instance in which the surface of the package 110 is parallel to the pallet 114a, the package plane may have a constant Z coordinate value.

At step 1504, the computing device 106 includes means such as the processor 202, the image processing unit 216, and/or the like, for determining one or more intersection coordinates corresponding to location on the 3D region where the package plane intersects the 3D region. As discussed, the 3D region has the one or more virtual wall regions that extend from the base region, therefore, the package plane intersects the one or more virtual wall regions. Further, since the one or more virtual wall regions are defined using virtual wall planes, therefore, the image processing unit 516 may be configured to utilize plane intersection determination techniques in the 3D coordinate system to determine a straight line equation that represents a straight line depicting the intersection between the package plane and one of the one or more virtual wall planes. For example, to determine the straight line equation, the image processing unit 216 may be configured to determine the plane equations for the package plane based on the one or more decodable indicia spatial coordinates values. Similarly, the image processing unit 216 may be configured to determine the virtual wall plane equation based on the one or more 3D region coordinate values. For instance, image processing unit 216 determines following the package plane equation:

$$aX+bY+d=0 \quad (7)$$

Further, the image processing unit 216 determines the following virtual wall plane equation:

$$eX+fZ+h=0 \quad (8)$$

In an example embodiment, the image processing unit 216 may be configured to solve the equations 5 and 6 to determine the straight line equation.

Similarly, the image processing unit 216 may be configured to determine other straight lines indicating the intersection between the package plane and other wall planes.

In an example embodiment, image processing unit 216 may be further configured to determine 3D points in the 3D space where the one or more straight lines intersect with each other. In an example embodiment, the coordinates of the 3D points where the one or more straight lines intersect with each other corresponds to the one or more intersection coordinates. In an example embodiment, the one or more straight lines define the 3D boundary region for the package 110.

In an alternative embodiment, the image processing unit 216 may be configured to utilize the one or more 3D region coordinates to determine one or more straight line equations representative of straight lines that extend from one or more corners of the base region of the 3D region and are perpendicular to the base region. Thereafter, the image processing unit 216 may be configured to determine a point where the straight line and the package plane intersects. In an example embodiment, the point (where the package plane and the straight line intersects) corresponds to the intersection point. Similarly, the image processing unit 216 may be configured to determine other one or more intersection points.

At step 1506, the computing device 106 includes means such as the processor 202, the image processing unit 216, and/or the like, for determining one or more package spatial coordinates of the package for which the image processing unit 216 defines the package plane in the step 1502. In an example embodiment, the image processing unit 216 may be configured to determine the one or more package spatial coordinates using similar methodology as is described in the steps 902 and 904. For example, the image processing unit 216 may be configured to identify the package 110 in the captured image using one or more object identification techniques such as, but not limited to SIFT. Thereafter, the image processing unit 216 may be configured to determine the one or more package image coordinates based on the identification of the package in the captured image. In an example embodiment, the one or more package image coordinates may represent the position of the one or more corners of the package 110 in the captured image. Thereafter, the image processing unit 216 may be configured to determine the one or more package spatial coordinates based on the one or more package image coordinates and the corrective factor (determined in the flowchart 800). For instance, the image processing unit 216 may be configured to utilize equation 4 to determine the one or more package spatial coordinates. In an example embodiment, the one or more package spatial coordinates represents the position of the one or more corners of the package 110 in the 3D space.

In alternative embodiment, the image processing unit 216 may be configured to identify the package 110 and accordingly determine the one or more package coordinates using the depth sensor (not shown) in the image capturing device 102. In such an implementation, the image processing unit 216 may receive a 3D point cloud from the image capturing device 102 based on which the image processing unit 216 may be configured to identify the package 110 and determine the one or more package coordinates of the package 110. U.S. patent application Ser. No. 16/146,175, filed on Sep. 28, 2018, which is incorporated by reference in its entirety herein, describes one such method of determining the one or more package coordinates from a 3D point cloud.

At step 1508, the computing device 106 includes means such as the processor 202, the image processing unit 216, and/or the like, for comparing each of the one or more package spatial coordinates with the one or more intersection coordinates to determine whether the portion of the package 110 protrude out from the 3D region. In some examples, to compare the each of the one or more package spatial coordinates with the one or more intersection coordinates, the image processing unit 216 may be configured to determine a second X coordinate range, a second Y coordinate range, and a second Z coordinate range based on the values of the one or more intersection coordinates. To this end, In some examples, the image processing unit 216 may be configured to determine a maximum and a minimum X coordinate value among the X coordinate values of the one or more intersection coordinates. Thereafter, the image processing unit 216 may be configured to determine the second X coordinate range as minimum x coordinate value to maximum x coordinate value. Similarly, the image processing unit 216 may be configured to determine the second Y coordinate range and the second Z coordinate range.

Subsequently, the image processing unit 216 may be configured to determine whether at least one of the X coordinate value, the Y coordinate value, and the Z coordinate value of at least one of the one or more package spatial coordinates is outside the second X coordinate range, the second Y coordinate range, and the second Z coordinate range, respectively. In an instance in which the image processing unit 216 determines that at least one of the X coordinate value, the Y coordinate value, and the Z coordinate value of at least one of the one or more package spatial coordinates is outside the second X coordinate range, the second Y coordinate range, and the second Z coordinate range, the image processing unit 216 determines that the portion of the package 110 protrudes out from the 3D region.

If the image processing unit 216 determines that the portion of the package 110 does not protrudes out from the 3D region, the processor 202 may be configured to repeat the step 1502 for other packages in the 3D region. However, if the image processing unit 216 determines that the portion of the package 110 protrude out from the 3D region, the image processing unit 216 may be configured to perform the step 1510.

At step 1510, the computing device 106 includes means such as the processor 202, the image processing unit 216, and/or the like, for generating a notification that indicative of the portion of the package 110 protruding out from the 3D region. In an example embodiment, the notification may correspond to an audio notification that may correspond to an alarm in the material handling environment 100. In some examples, the notification may be transmitted to mobile computer being carried by the worker in the material handling environment 100. In an example embodiment, the notification may include information pertaining to the location of the package 110 that protrudes out from the 3D region.

Figure 16:
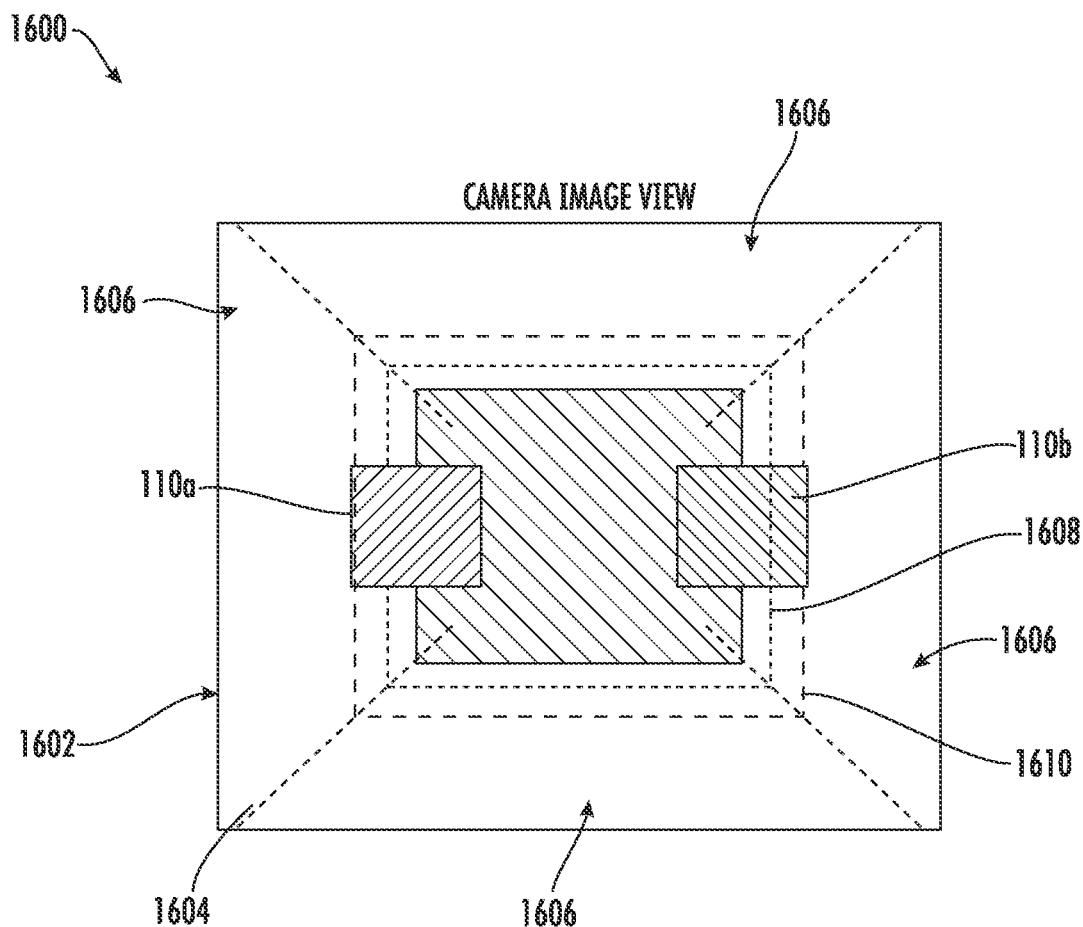
FIG. 16 illustrates an example scenario for determining whether the portion of the package protrude out from the 3D region, according to one or more embodiments described herein.

FIG. 16 illustrates an example scenario 1600 for determining whether the portion of the package 110 protrude out from the 3D region, according to one or more embodiments described herein.

The example scenario 1600 depicts the field of view 1602 of the image capturing device 102. The field of view 1602 includes the packages 110a and 110b and the defined 3D region 1604. The defined 3D region 1604 includes one or more virtual wall regions 1606. Additionally, the field of view 1602 depicts the 3D boundary region 1608 for the package 110a and the 3D boundary region 1610 for the package 110b. As discussed, the 3D boundary region 1608 and 1610 indicates an intersection of the respective package planes with the one or more virtual wall regions 1606. Further, it can be observed from FIG. 16 that the package 110a protrudes out from the 3D boundary region 1608, while the package 110b is within the 3D region 1604. Accordingly, image processing unit 216 may identify the packages (e.g., 110a) that protrude out from the 3D region using the methodology described in the FIG. 15.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art, the order of steps in some of the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any processor, controller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A system comprising a processor configured to;
identify one or more 2-dimensional (2D) image coordinates of at least one decodable indicia associated with a package;
identify one or more 3-dimensional (3D) region coordinates to define a 3D region, wherein the 3D region is adapted to be filled with a plurality of packages;
transform the one or more 2D image coordinates to one or more decodable indicia spatial coordinates in a 3D coordinate system;
compare the one or more decodable indicia spatial coordinates with the one or more 3D region coordinates to determine whether at least a portion of the package is present inside the 3D region; and
in response to determining that at least the portion of the package is present inside the 3D region, decode the at least one decodable indicia.

2. The system of claim 1, further comprising: a computing device, wherein the computing device comprising the processor and a memory including computer program code, the memory and the computer program code are configured, when executed on the processor, to:
access an image captured by an image capturing device, wherein the image comprises the at least one decodable indicia associated with the package.

3. The system of claim 2, wherein, the memory and the computer program code are further configured to transform the one or more 2D image coordinates to the one or more decodable indicia spatial coordinates based on one or more parameters associated with the image capturing device.

4. The system of claim 3, wherein, the one or more parameters including at least one of: a focal length of the image capturing device, a distance of the image capturing device from a floor, coordinates of an optical center, or a mount angle of the image capturing device.

5. The system of claim 4, wherein the image capturing device comprises a depth sensor to determine the distance of the image capturing device from the floor.

6. The system of claim 1, wherein each of the one or more 2D image coordinates of the at least one decodable indicia define the at least one decodable indicia in the image using a 2D coordinate system and each of the one or more 3D region coordinates define the 3D region using the 3D coordinate system.

7. The system of claim 1, wherein the one or more 2D image coordinates of the at least one decodable indicia correspond to a series of opposing points that are usable to identify dimensions of the at least one decodable indicia.

8. The system of claim 2, wherein the memory and the computer program code are further configured, when executed on the processor, to:
identify one or more package coordinates in the 3D coordinate system, wherein each of the one or more package coordinates define a corner of the package;
determine whether the package protrudes beyond one or more virtual wall regions based on a comparison of the one or more package coordinates to one or more intersection coordinates, and
generate a notification in an instance in which the package protrudes beyond the one or more virtual wall regions, wherein the notification includes information pertaining to a location of the package that protrudes out from the 3D region.

9. The system of claim 2, wherein the memory and the computer program code are further configured, when executed on the processor, to:
determine whether the package is inside the 3D region; and
in an instance in which the package is outside the 3D region, determine that the package is not within the 3D region.

10. The system of claim 9, wherein the memory and the computer program code are further configured to retrieve a whitelist from a database based on an identified pallet when the package is inside the 3D region, where the whitelist include a list of packages that are intended to be on the identified pallet and compare information retrieved from the at least one decodable indicia associated with the package with the whitelist to determine whether the package is on the identified pallet.

11. A method comprising:
identifying one or more 2-dimensional (2D) image coordinates of at least one decodable indicia associated with a package;
identifying one or more 3-dimensional (3D) region coordinates to define a 3D region, wherein the 3D region is adapted to be filled with a plurality of packages;
transforming the one or more 2D image coordinates to one or more decodable indicia spatial coordinates in a 3D coordinate system;
comparing the one or more decodable indicia spatial coordinates with the one or more 3D region coordinates to determine whether at least a portion of the package protrudes out from is present inside the 3D region; and
in response to determining that at least the portion of the package is present inside the 3D region, decoding the at least one decodable indicia.

12. The method of claim 11, further comprising:
receiving an image of a field of view of an image capturing device, the image comprising the at least one decodable indicia having a predefined shape, the at least one decodable indicia is associated with the package.

13. The method of claim 12, wherein, transforming the one or more 2D image coordinates to the one or more decodable indicia spatial coordinates based on one or more parameters associated with the image capturing device.

14. The method of claim 13, wherein, the one or more parameters including at least one of: a focal length of the image capturing device, a distance of the image capturing device from a floor, coordinates of an optical center, or a mount angle of the image capturing device.

15. The method of claim 14, wherein determining the distance of the image capturing device from the floor using a depth sensor of the image capturing device.

16. The method of claim 11, wherein each of the one or more 2D image coordinates of the at least one decodable indicia define the at least one decodable indicia in the image using a 2D coordinate system and each of the one or more 3D region coordinates define the 3D region using the 3D coordinate system.

17. The method of claim 11, wherein the one or more 2D image coordinates of the at least one decodable indicia correspond to a series of opposing points that are usable to identify dimensions of the at least one decodable indicia.

18. An image capturing device comprising a processor, the processor configured to:
determine one or more 2-dimensional (2D) image coordinates of at least one decodable indicia associated with a package;
identify one or more 3-dimensional (3D) region coordinates to define a 3D region, wherein the 3D region is adapted to be filled with a plurality of packages;
transform the one or more 2D image coordinates to one or more decodable indicia spatial coordinates in a 3D coordinate system;
compare the one or more decodable indicia spatial coordinates with the one or more 3D region coordinates to determine whether at least a portion of the package is present inside the 3D region; and
in response to determining that at least the portion of the package is present inside the 3D region, decode the at least one decodable indicia.

19. The image capturing device of claim 18, wherein the processor further configured to:
determine interim values of an X-coordinate and a Y-coordinate of the at least one decodable indicia in the 3D coordinate system;
determine an actual value of a Z-coordinate of the at least one decodable indicia based on a corrective factor and an interim value of the Z-coordinate; and
determine an actual value of the X-coordinate and the Y-coordinate of the at least one decodable indicia based on the actual value of the Z-coordinate, wherein each of the one or more decodable indicia spatial coordinates comprise the X-coordinate, the Y-coordinate, and the Z-coordinate.

20. The image capturing device of claim 19, wherein the processor further configured to:
- determine the interim value of the Z-coordinate;
- determine a length of the at least one decodable indicia based on the interim values of the Z-coordinate, the X-coordinate, and the Y-coordinate; and
- determine the corrective factor based on the determined length of the at least one decodable indicia and a predefined length of the at least one decodable indicia.

* * * * *